US012015998B2

United States Patent
Xue et al.

(10) Patent No.: US 12,015,998 B2
(45) Date of Patent: Jun. 18, 2024

(54) DEVICE COOPERATION FOR MITIGATION OF DEAFNESS IN SIDELINK COMMUNICATIONS

(71) Applicant: QUALCOMM INCORPORATED, San Diego, CA (US)

(72) Inventors: Yisheng Xue, San Diego, CA (US); Xiaoxia Zhang, San Diego, CA (US); Jing Sun, San Diego, CA (US); Chih-Hao Liu, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 17/453,693

(22) Filed: Nov. 5, 2021

(65) Prior Publication Data

US 2023/0147231 A1  May 11, 2023

(51) Int. Cl.
*H04W 72/02* (2009.01)
*H04W 72/044* (2023.01)
*H04W 72/0446* (2023.01)
*H04W 72/56* (2023.01)
*H04W 88/18* (2009.01)

(52) U.S. Cl.
CPC ....... *H04W 72/02* (2013.01); *H04W 72/0446* (2013.01); *H04W 72/046* (2013.01); *H04W 72/56* (2023.01); *H04W 88/182* (2013.01)

(58) Field of Classification Search
CPC ............. H04W 72/02; H04W 72/0446; H04W 72/046; H04W 72/56; H04W 88/182
See application file for complete search history.

(56) References Cited

U.S. PATENT DOCUMENTS 10,555,259 B2  2/2020 Jung et al.
10,708,734 B2  7/2020 Cavalcanti et al.
(Continued)

FOREIGN PATENT DOCUMENTS

WO   WO-2018024066 A1 *  2/2018

OTHER PUBLICATIONS

Partial International Search Report—PCT/US2022/048227—ISA/EPO—dated Mar. 10, 2023 (2106502WO).
(Continued)

*Primary Examiner* — Chae S Lee
(74) *Attorney, Agent, or Firm* — Holland & Hart LLP

(57) ABSTRACT

Methods, systems, and devices for wireless communications are described. A first and second user equipment (UE) may perform a handshake procedure to establish a cooperation agreement designating one or more frequency and time resources which the first UE is to act as the proxy device for the second UE. For example, the first UE may receive a sidelink message directed to a second UE from a third UE. The first UE may determine to act as a proxy device for the second UE with respect to the sidelink message based on the sidelink message being received during a time resource designated for the first UE to act as the proxy device for the second UE. The first UE may proceed to transmit to the third UE feedback information associated with the sidelink message, and may transmit the sidelink message to the second UE on behalf of the third UE.

30 Claims, 13 Drawing Sheets

(56) References Cited

U.S. PATENT DOCUMENTS

| | | | |
|---|---|---|---|
| 2010/0151865 A1* | 6/2010 | Camp, Jr. | H04W 72/046 |
| | | | 455/445 |
| 2011/0093600 A1* | 4/2011 | Lee | H04L 67/148 |
| | | | 709/228 |
| 2018/0084497 A1* | 3/2018 | Jung | H04W 92/18 |
| 2018/0167790 A1* | 6/2018 | Cavalcanti | H04W 4/44 |
| 2019/0096243 A1* | 3/2019 | Doig | G08G 1/09 |
| 2020/0059914 A1* | 2/2020 | Akoum | H04W 4/44 |
| 2020/0119849 A1* | 4/2020 | Su | H04B 7/026 |
| 2020/0245311 A1 | 7/2020 | Uchiyama et al. | |
| 2020/0266936 A1* | 8/2020 | Wang | H04L 5/0055 |
| 2021/0083804 A1 | 3/2021 | Zhou et al. | |

OTHER PUBLICATIONS

International Search Report and Written Opinion—PCT/US2022/048227—ISA/EPO—dated Jun. 16, 2023.

* cited by examiner

DEVICE COOPERATION FOR MITIGATION OF DEAFNESS IN SIDELINK COMMUNICATIONS

FIELD OF TECHNOLOGY

The following relates to wireless communications, including device cooperation for mitigation of deafness in sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some cases, during sidelink communications, a user equipment (UE) may suffer from one or more kinds of deafness. For example, a UE that is in communication during a particular slot may be unable to receive transmissions from another UE.

SUMMARY

The described techniques relate to improved methods, systems, devices, and apparatuses that support device cooperation for mitigation of deafness in sidelink communications. Generally, the described techniques provide for scenarios in which a user equipment (UE) is deaf (e.g., unable to receive communications from another UE) during sidelink communications, and a second UE may act as a proxy receiver for the first UE. For example, the first UE and second UE may reach an agreement (e.g., over PC5-radio resource control (RRC) signaling) defining rules or conditions under which the second UE may act as a proxy for the first UE. For instance, the UEs may agree (e.g., negotiate, via a handshake procedure) to a set of one or more slots during which the second UE may act as the proxy receiver for the first UE. Other conditions may also trigger the proxy behavior, including if the second UE both receives a transmission from the first UE as well as a transmission directed to the first UE in the same slot. In that situation, the proxy UE may understand that the first UE is operating in a half-duplex operation and thus is not able to receive while it is also transmitting.

While acting as the proxy receiver, if the second UE identifies that a third UE is transmitting sidelink information to the first UE, the second UE may transmit feedback signaling to the third UE. For instance, the second UE may transmit a negative acknowledgement (NACK) response to the third UE on behalf of the first UE. In such examples, the second UE may refrain from decoding the physical sidelink shared channel (PSSCH) associated with the sidelink control information (SCI), and may simply NACK the transmission to trigger a retransmission (e.g., to be received by the first UE after the deaf slot). In some cases, the second UE may transmit an acknowledgement (ACK) message to the third UE, and may also decode the sidelink transmission from the third UE. The second UE may relay the decoded transmission to the first UE after the deaf slot. In some examples, the second UE may trigger a retransmission, and may participate in the retransmission process (e.g., may forward the decode sidelink transmission to the third UE using resources associated with the retransmission).

A method for wireless communications at a first user equipment (UE) is described. The method may include receiving, at the first UE and on a sidelink channel, a sidelink message directed to a second UE and transmitted by a third UE, determining that the first UE is to act as a proxy device for the second UE with respect to the sidelink message based on the sidelink message being received during a time resource designated for the first UE to act as the proxy device for the second UE, and transmitting, to the third UE based on the determining, feedback information associated with the sidelink message.

An apparatus for wireless communications at a first UE is described. The apparatus may include a processor, memory coupled with the processor, and instructions stored in the memory. The instructions may be executable by the processor to cause the apparatus to receive, at the first UE and on a sidelink channel, a sidelink message directed to a second UE and transmitted by a third UE, determine that the first UE is to act as a proxy device for the second UE with respect to the sidelink message based on the sidelink message being received during a time resource designated for the first UE to act as the proxy device for the second UE, and transmit, to the third UE based on the determining, feedback information associated with the sidelink message.

Another apparatus for wireless communications at a first UE is described. The apparatus may include means for receiving, at the first UE and on a sidelink channel, a sidelink message directed to a second UE and transmitted by a third UE, means for determining that the first UE is to act as a proxy device for the second UE with respect to the sidelink message based on the sidelink message being received during a time resource designated for the first UE to act as the proxy device for the second UE, and means for transmitting, to the third UE based on the determining, feedback information associated with the sidelink message.

A non-transitory computer-readable medium storing code for wireless communications at a first UE is described. The code may include instructions executable by a processor to receive, at the first UE and on a sidelink channel, a sidelink message directed to a second UE and transmitted by a third UE, determine that the first UE is to act as a proxy device for the second UE with respect to the sidelink message based on the sidelink message being received during a time resource designated for the first UE to act as the proxy device for the second UE, and transmit, to the third UE based on the determining, feedback information associated with the sidelink message.

Some examples of the method, apparatuses, and non-transitory computer-readable medium described herein may further include operations, features, means, or instructions for receiving, from the second UE, control signaling designating a set of periodic time resources including the time resource for the first UE to act as the proxy device for the second UE, where determining that the first UE may be to act as the proxy device for the second UE with respect to the sidelink message may be based on receiving the control signaling.

In some examples of the method, apparatuses, and non-transitory computer-readable medium described herein, receiving the control signaling designating the set of periodic time resources for the first UE to act as the proxy device for the second UE may include operations, features, means, or instructions for receiving RRC signaling via the sidelink channel including a set of parameters, the set of parameters including a periodicity of the set of periodic time resources, an offset value for the set of periodic time resources, a length indicator for each of the rely time resources, or any combination thereof.

In some examples of the method, apparatuses, and non-transitory computer-readable medium described herein, receiving the control signaling designating the set of periodic time resources for the first UE to act as the proxy device for the second UE may include operations, features, means, or instructions for receiving the control signaling designating of the set of periodic time resources during a cooperation establishment procedure for establishing a cooperation agreement.

In some examples of the method, apparatuses, and non-transitory computer-readable medium described herein, determining that the first UE may be to act as the proxy device for the second UE with respect to the sidelink message may include operations, features, means, or instructions for receiving, the sidelink message on a first beam of a set of beams, where the set of beams may be associated with the first UE acting as the proxy device for the second UE.

Some examples of the method, apparatuses, and non-transitory computer-readable medium described herein may further include operations, features, means, or instructions for receiving, from the first UE an indication of the set of beams during a cooperation establishment procedure for establishing a cooperation agreement.

Some examples of the method, apparatuses, and non-transitory computer-readable medium described herein may further include operations, features, means, or instructions for determining that the second UE may be located in a geographic coverage area associated with the first beam, where determining that the first UE may be to act as the proxy device for the second UE with respect to the sidelink message may be based on determining that the second UE may be located in the geographic coverage area associated with the first beam.

In some examples of the method, apparatuses, and non-transitory computer-readable medium described herein, determining that the first UE may be to act as the proxy device for the second UE with respect to the sidelink message may include operations, features, means, or instructions for determining that the sidelink message transmitted by the third UE satisfies one or more conditions.

In some examples of the method, apparatuses, and non-transitory computer-readable medium described herein, determining that the sidelink message satisfies the one or more conditions may include operations, features, means, or instructions for determining that a device identifier for the sidelink message may be one of a set of device identifiers identified in a coordination agreement, determining that the sidelink message may be a cast type identified in a coordination agreement, determining that the sidelink message may be associated with a sidelink priority level identified in a coordination agreement, determining that the sidelink message may be associated with a number of retransmissions identified in a coordination agreement, determining that the sidelink message includes a flag indicating a packet delay budget threshold, determining that the UE may be located in a geographic coverage area associated with the time resource, or any combination thereof.

In some examples of the method, apparatuses, and non-transitory computer-readable medium described herein, determining that the first UE may be to act as the proxy device for the second UE with respect to the sidelink message may include operations, features, means, or instructions for receiving the sidelink message as a unicast sidelink message addressed to the second UE during the time resource.

Some examples of the method, apparatuses, and non-transitory computer-readable medium described herein may further include operations, features, means, or instructions for receiving, from the second UE, a SCI message designating the time resource for the first UE to act as the proxy device for the second UE, where determining that the first UE may be to act as the proxy device for the second UE with respect to the sidelink message may be based on receiving the SCI message.

Some examples of the method, apparatuses, and non-transitory computer-readable medium described herein may further include operations, features, means, or instructions for transmitting, to the second UE, an indication that the first UE received the sidelink message transmitted by the third UE during the time resource.

In some examples of the method, apparatuses, and non-transitory computer-readable medium described herein, transmitting the feedback information may include operations, features, means, or instructions for transmitting a NACK feedback message triggering a retransmission of the sidelink message.

Some examples of the method, apparatuses, and non-transitory computer-readable medium described herein may further include operations, features, means, or instructions for refraining from decoding a data message associated with the sidelink message, where the sidelink message includes a SCI message.

Some examples of the method, apparatuses, and non-transitory computer-readable medium described herein may further include operations, features, means, or instructions for decoding the sidelink message and transmitting, to the first UE on sidelink resources associated with the triggered retransmission, the sidelink message.

In some examples of the method, apparatuses, and non-transitory computer-readable medium described herein, transmitting the feedback information may include operations, features, means, or instructions for transmitting an ACK feedback message to the third UE indicating that the second UE successfully received the sidelink message.

Some examples of the method, apparatuses, and non-transitory computer-readable medium described herein may further include operations, features, means, or instructions for decoding the sidelink message, transmitting, to the first UE, an activation of a set of sidelink resources allocated for forwarding signaling received during the time resource, and transmitting, to the first UE on the set of sidelink resources, the sidelink message.

Some examples of the method, apparatuses, and non-transitory computer-readable medium described herein may further include operations, features, means, or instructions for performing a handshake procedure with the first UE to establish a cooperation agreement designating one or more time resources including the time resource, one or more conditions, one or more beams, or any combination thereof, for which the UE may be to act as the proxy device for the second UE.

A method for wireless communications at a second UE is described. The method may include determining that a first UE is to act as a proxy device for the second UE with respect to a sidelink message transmitted by a third UE to the second UE based on the sidelink message being transmitted by the third UE during a time resource designated for the first UE to act as the proxy device for the second UE, performing sidelink communications with the first UE or a fourth UE on a sidelink channel during the time resource, and receiving, after the time resource and based on the determining, a retransmission of the sidelink message from the third UE, or the sidelink message forwarded by the second UE.

An apparatus for wireless communications at a second UE is described. The apparatus may include a processor, memory coupled with the processor, and instructions stored in the memory. The instructions may be executable by the processor to cause the apparatus to determine that a first UE is to act as a proxy device for the second UE with respect to a sidelink message transmitted by a third UE to the second UE based on the sidelink message being transmitted by the third UE during a time resource designated for the first UE to act as the proxy device for the second UE, perform sidelink communications with the first UE or a fourth UE on a sidelink channel during the time resource, and receive, after the time resource and based on the determining, a retransmission of the sidelink message from the third UE, or the sidelink message forwarded by the second UE.

Another apparatus for wireless communications at a second UE is described. The apparatus may include means for determining that a first UE is to act as a proxy device for the second UE with respect to a sidelink message transmitted by a third UE to the second UE based on the sidelink message being transmitted by the third UE during a time resource designated for the first UE to act as the proxy device for the second UE, means for performing sidelink communications with the first UE or a fourth UE on a sidelink channel during the time resource, and means for receiving, after the time resource and based on the determining, a retransmission of the sidelink message from the third UE, or the sidelink message forwarded by the second UE.

A non-transitory computer-readable medium storing code for wireless communications at a second UE is described. The code may include instructions executable by a processor to determine that a first UE is to act as a proxy device for the second UE with respect to a sidelink message transmitted by a third UE to the second UE based on the sidelink message being transmitted by the third UE during a time resource designated for the first UE to act as the proxy device for the second UE, perform sidelink communications with the first UE or a fourth UE on a sidelink channel during the time resource, and receive, after the time resource and based on the determining, a retransmission of the sidelink message from the third UE, or the sidelink message forwarded by the second UE.

In some examples of the method, apparatuses, and non-transitory computer-readable medium described herein, determining that the first UE may be to act as the proxy device for the second UE may include operations, features, means, or instructions for performing a handshake procedure with the first UE to establish a cooperation agreement designating one or more time resources including the time resource, one or more conditions, one or more beams, or any combination thereof, for which the first UE may be to act as the proxy device for the second UE.

In some examples of the method, apparatuses, and non-transitory computer-readable medium described herein, receiving the retransmission of the sidelink message may include operations, features, means, or instructions for receiving the retransmission of the sidelink message from the third UE.

In some examples of the method, apparatuses, and non-transitory computer-readable medium described herein, receiving the retransmission of the sidelink message may include operations, features, means, or instructions for receiving the retransmission of the sidelink message from the second UE via a set of sidelink resources allocated for retransmission of the sidelink message by the third UE.

DETAILED DESCRIPTION

Figure 1:
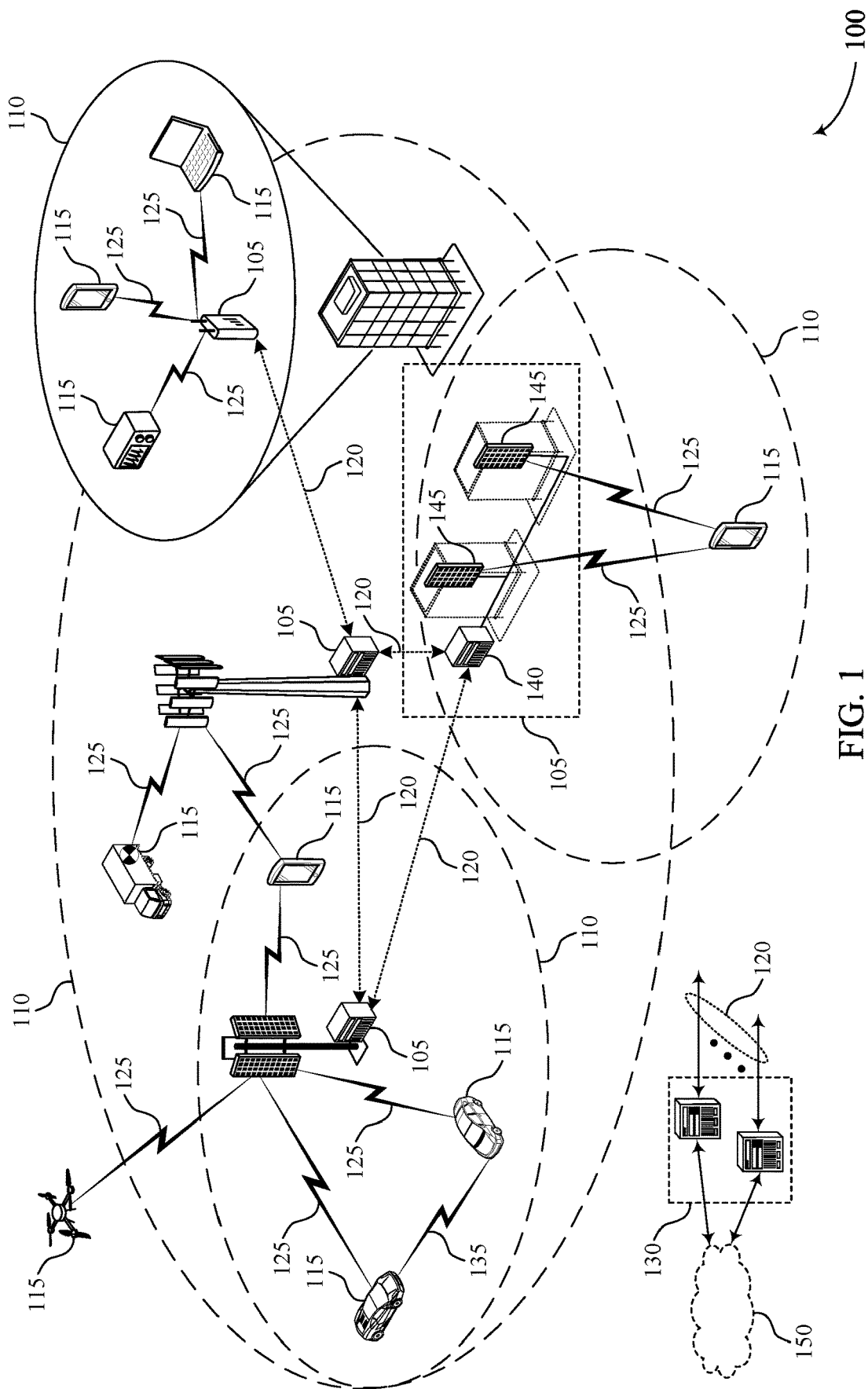
FIG. 1 illustrates an example of a wireless communications system that supports device cooperation for mitigation of deafness in sidelink communications in accordance with aspects of the present disclosure.

In some wireless communication systems, such as 5G new radio (NR), wireless devices may utilize sidelink communications for signaling information between user equipments (UEs). For example, UEs and vehicles, among other wireless devices, may exchange safety related messages in a vehicle-to-everything (V2X) system. In some cases, wireless devices communicating over sidelink may utilize one or more vertical domains which may correspond to bandwidths between 6 GHz and 60 GHz. When operating in some frequency ranges (e.g., between 6 GHz and 60 GHz), UEs may utilize beamforming techniques (e.g., beam alignment to compensate for large propagation losses) to increase signaling throughput and reduce latency. Upon establishing beam alignment, a first UE may transmit information to a destination device utilizing beamformed communications over sidelink. However, beamforming alignment is a resource intensive procedure, especially for NR sidelink communications (e.g., for safety messages between many vehicles in a V2X system). For example, beamforming alignment may involve multiple channel access procedures, consume a significant amount of radio resources, and suffer from non-trivial latency. In some examples, (e.g., for sidelink messages configured for relatively low latency communications), UEs may transmit sidelink messages without performing beamforming alignment to reduce signaling overhead and latency associated with beamforming alignment procedures. However, by not performing beamforming alignment, sidelink communications may experience relatively poor signal reliability due to deafness.

A UE may experience one or more kinds of deafness. In some examples, a first UE may experience half-duplex deafness such that the first UE may be unable to receive sidelink information from a second UE while simultaneously transmitting information to a third UE. In some examples, the first UE may experience narrow reception beam deafness such that the first UE may be unable to receive simultaneous sidelink transmissions from multiple UEs. For instance, if the first UE is communicating on one beam with a second UE, then it may be unable to receive communications (e.g., may be deaf) on another beam. In some examples, the first UE may experience unavailable radio deafness such that the first UE may be unable to receive sidelink information from another UE based on operating in a sleep mode of a discontinuous reception (DRX) mode or based on tuning to a frequency band or sub-band different from the transmitting UE.

According to the techniques described herein, a second UE may act as a proxy receiver for the first UE when the first UE is experiencing deafness. For example, the first UE and the second UE may reach an agreement via sidelink radio resource control (RRC) signaling (e.g., PC5-RRC) for the second UE to act as the proxy receiver for the first UE during one or more slots where the first UE will experience deafness. While acting as the proxy receiver, if the second UE identifies that a third UE is transmitting sidelink information to the first UE, the second UE may transmit feedback information (e.g., either an acknowledgment (ACK) or a non-acknowledgment (NACK) response message) to the third UE on behalf of the first UE. In some cases, if the second UE transmits a NACK response message to the third UE, the third UE may attempt to retransmit the sidelink information to the first UE. In some cases, if the second UE transmits a NACK response message to the third UE, the second UE may decode the sidelink transmission from the third UE and may participate in a spatial frequency network (SFN) manner retransmission from the third UE to the first UE. In some cases, if the second UE transmits an ACK response to the third UE, the second UE may decode the sidelink transmission from the third UE and relay the sidelink transmission to the first UE.

In some cases, the first UE may request the second UE to perform opportunistic proxy reception during slots that the second UE detects sidelink control information (SCI) from the first UE (e.g., when the first UE is communicating with the second UE in half-duplex mode). In some examples, the second UE may perform opportunistic proxy reception when it is the intended receiver of a unicast transmission from the first UE or when the first UE provides an indication to the second UE in an SCI message requesting opportunistic proxy reception. In some cases, the first UE and the second UE may agree on a pre-configured set of slots that the second UE may perform proxy reception for the first UE during. In some examples, the second UE may operate as a proxy UE if one or more conditions are satisfied. By utilizing proxy reception at a second UE, the first UE may benefit from a decrease in signaling overhead, a decrease in latency, and an increase in the overall efficiency of the sidelink network.

Aspects of the disclosure are initially described in the context of wireless communications systems. Aspects of the disclosure are further illustrated by sidelink transmission timelines and process flows. Aspects of the disclosure are further illustrated by and described with reference to apparatus diagrams, system diagrams, and flowcharts that relate to device cooperation for mitigation of deafness in sidelink communications.

FIG. 1 illustrates an example of a wireless communications system 100 that supports device cooperation for mitigation of deafness in sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or another network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE may experience one or more deaf slots in which the UE 115 may be unable to effectively receive wireless communication messages from other network devices When a UE is deaf during sidelink communications, a second UE may act as a proxy receiver for the first UE. For example, the first UE and second UE may reach an agreement (e.g., over PC5-radio resource control (RRC) signaling) defining rules or conditions under which the second UE will act as a proxy for the first UE. For instance, the UEs may agree (e.g., negotiate, via a handshake procedure) to a set of one or more slots during which the second UE may act as the proxy receiver for the first UE. Other conditions may also trigger the proxy behavior, including if the second UE both receives a transmission from the first UE as well as a transmission directed to the first UE in the same slot. In that situation, the proxy UE may understand that the first UE is operating in a half-duplex operation and thus is not able to receive while it is also transmitting.

While acting as the proxy receiver, if the second UE identifies that a third UE is transmitting sidelink information to the first UE, the second UE may transmit feedback signaling to the third UE. For instance, the second UE may transmit a negative acknowledgement (NACK) response to the third UE on behalf of the first UE. In such examples, the second UE may refrain from decoding the physical sidelink shared channel (PSSCH) associated with the sidelink control information (SCI), and may simply NACK the transmission to trigger a retransmission (e.g., to be received by the first UE after the deaf slot). In some cases, the second UE may transmit an acknowledgement (ACK) message to the third UE, and may also decode the sidelink transmission from the third UE. In some cases, if the second UE transmits a NACK response message to the third UE, the second UE may decode the sidelink transmission from the third UE and may participate in an SFN-manner retransmission from the third UE to the first UE. High-efficiency flooding (e.g., opportunistic cooperative relaying) of sidelink signals using SFN-type retransmissions may be utilized for sporadically exchanging packets between a pair of UEs 115 without establishing or maintaining beamforming alignment. Utilizing opportunistic cooperative relaying may enable the second UE and the third UE 115 to communicate sidelink signaling without performing beamforming alignment procedures, which may improve communication reliability, decrease signaling overhead, and decrease signaling latency for sidelink communications.

Figure 2A:
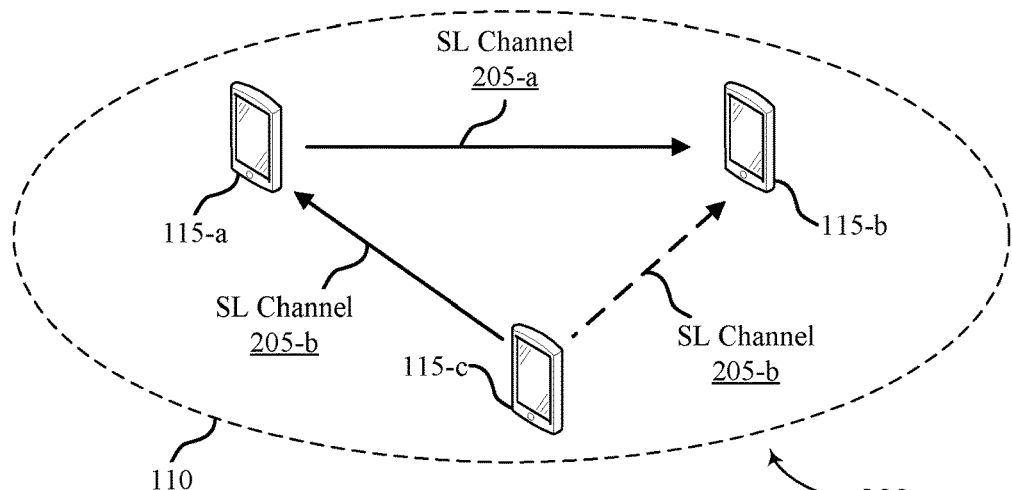
FIG. 2A-2C illustrates an example of a wireless communications systems that supports device cooperation for mitigation of deafness in sidelink communications in accordance with aspects of the present disclosure.
Figure 2B:
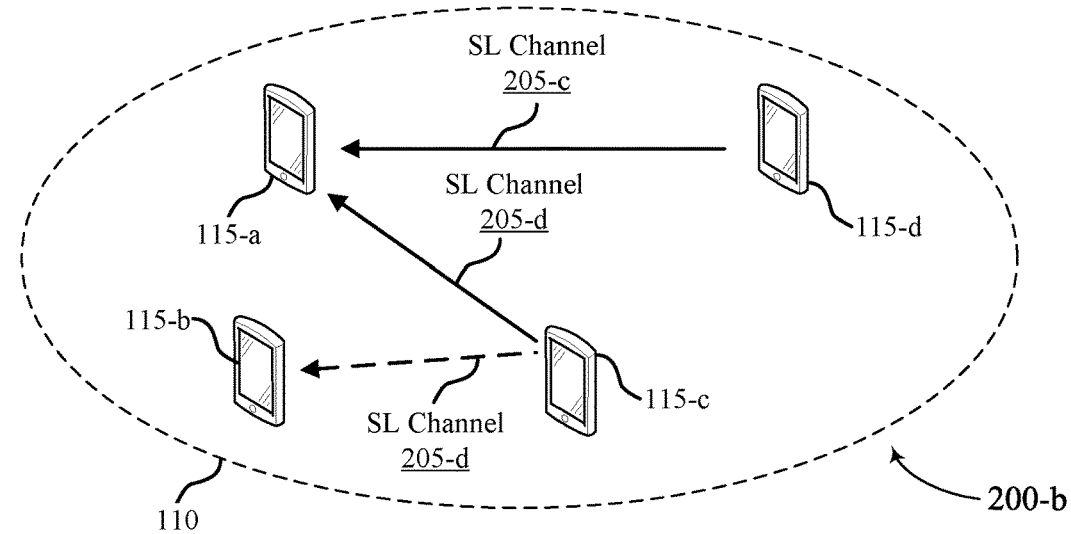
Figure 2C:
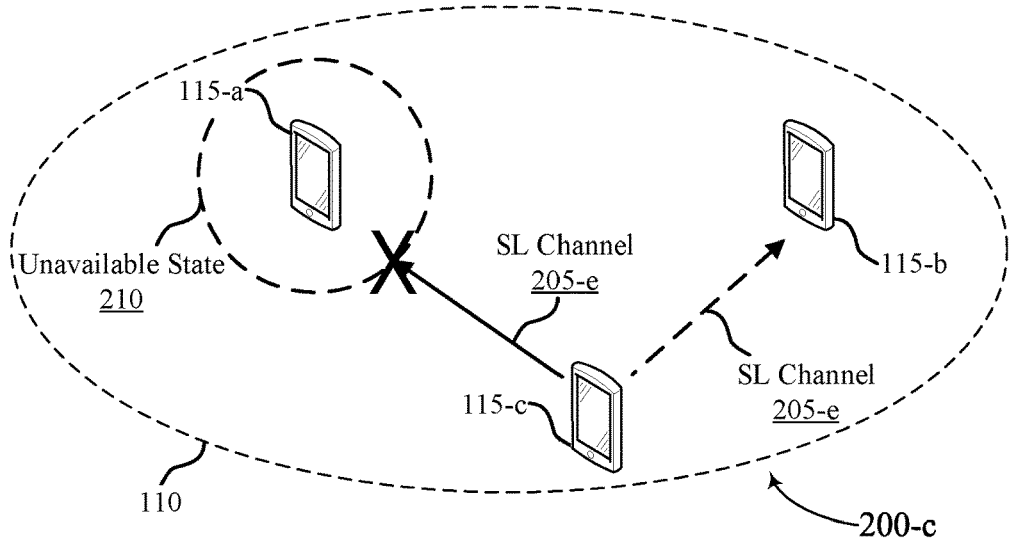

FIGS. 2A-2C illustrates an example of a wireless communications system 200-a through 200-c that supports device cooperation for mitigation of deafness in sidelink communications in accordance with aspects of the present disclosure. The wireless communications systems 200 may implement or be implemented by one or more aspects of the wireless communications system 100. For example, the wireless communications systems 200 may include a UE 115-a, a UE 115-b, a UE 115-c, and a UE 115-d which may be examples of UEs 115 as described with reference to FIG. 1. In some examples, the UE 115-a, the UE 115-b, the UE 115-c, and the UE 115-d may perform communications over sidelink channels. Specifically, the UE 115-a may benefit from utilizing one or more other UEs 115 as proxy receivers during instances of deafness to mitigate non-received data. It should be noted that, while examples are discussed below, any number of devices and device types may be used to accomplish implementations described in the present disclosure.

With reference to FIGS. 2A-2C the UEs 115-a, 115-b, 115-c, and 115-d may be located in a geographic area 110, which may correspond to an environment in which V2X systems utilize sidelink communications in a sub-6 GHz band to exchange information (e.g., for public safety). For example, NR sidelink may support broadcast, groupcast, and unicast communications between the UEs 115 such that during a channel access, a first UE 115 may transmit to a second UE 115 a coupled physical sidelink control channel (PSCCH) and PSSCH over a physical (PHY) sidelink channel 205. In some examples of sidelink communication, a first UE 115 may transmit sidelink control information (SCI) to a second UE 115 which may be jointly carried by a PSCCH and a PSSCH, and may indicate various types of sidelink information (e.g., resource occupancy/reservation, a sidelink layer 1 (L1) source ID, a sidelink L1 destination ID to identify the intended receiving UE 115, and a HARQ ACK or NACK response).

Some wireless communications systems, such as those utilizing 5G NR, may arrange sidelink communications into vertical domains (e.g., for public safety). For example, NR sidelink may promote the use of DRX modes (e.g., idle mode DRX or connected mode DRX), partial sensing at one or more UEs 115, inter-UE 115 coordination in sidelink mode 2, and UE-to-network relaying. In some cases, some vertical domains may not have access to sub-6 GHz licensed bands. Instead, the vertical domains may utilize bandwidths associated with 6 GHz and 60 GHz unlicensed bands. In some cases, beamforming alignment may be performed in higher frequency bands (e.g., millimeter wave (mmWave), 6

GHz and 60 GHz) to compensate for large propagation losses. While propagation losses over the 6 GHz unlicensed band may be low, transmission power limits (e.g., due to regulations) may result in a performance of beamforming alignment procedures to establish reasonable coverage.

As such, sidelink communications may not support for other bands (e.g., 6 GHz-60 GHz), which may further increase a resource burden associated with beamforming alignment (e.g., especially in NR sidelink). For example, there may not exist a standalone reference signal, such as channel state information-reference signals (CSI-RS) and sounding reference signals (SRS) for sidelink. Consequently, beamforming alignment may involve multiple channel accesses, which may consume a considerable amount of radio resources corresponding to signaling overhead which may result in a loss of beamforming alignment or an imperfect beamforming alignment. For example, FIGS. 2A-2C may illustrate different scenarios in which the UE 115-a may experience respective types of deafness due to an imperfect beam alignment, frequency diversity, operational modes (e.g., half-duplex operations), or any combination thereof.

With reference to FIG. 2A, the UE 115-a may initiate wireless communication via sidelink channel 205-a (e.g., a PSCCH or a PSSCH, or the like) with the UE 115-b. In some examples, the UE 115-a may also operate in accordance with a half-duplex mode in which the UE 115-a may either transmit or receive data at a given time (e.g., but not both simultaneously). In such examples, the UE 115-a may experience half-duplex deafness when transmitting data to the UE 115-b via sidelink channel 205-a. For example, as illustrated in FIG. 2A, while the UE 115-a transmits data to the UE 115-b, the UE 115-c may be concurrently attempting to transmit data via sidelink channel 205-b to the UE 115-a. As such, the UE may experience half-duplex deafness and may be unable to receive data from the UE 115-c while transmitting data to the UE 115-b.

With reference to FIG. 2B, the UE 115-a may receive concurrent sidelink information via sidelink channel 205-c and 205-d from the UE 115-d and the UE 115-c respectively. In some examples of these concurrent sidelink transmissions, the UE 115-a may receive the sidelink transmission from the UE 115-d via a narrow reception beam and may receive the sidelink transmission from the UE 115-c using a relatively wider reception beam. The use of narrow reception beam may result in a relatively low signal-to-noise ratio (SNR) over the beam sidelobes corresponding to the data transmitted using sidelink channel 205-c. As such, the UE 115-a may be unable to receive simultaneous transmissions from the UE 115-c and the UE 115-d without resulting in resource collisions, which may lead to narrow reception beam deafness at the UE 115-a.

With reference to FIG. 2C, the UE 115-a may operate in accordance with a DRX mode or may pursue frequency diversity in a GHz bandwidth via slow frequency hopping (e.g., hopping step size ≤100 MHz). If the UE 115-a is in a sleep mode associated with the DRX mode, or if the UE 115-a hops between various frequency bands or frequency sub-bands, the UE 115-a may be in an unavailable state 210 relative to the UE 115-c. In such examples, the UE 115-c may be unaware that the UE 115-a is in the unavailable state 210 and may attempt to transmit data to the UE 115-a resulting in unavailable radio deafness at the UE 115-a.

To mitigate the various types of deafness illustrated in FIGS. 2A-2C, a UE 115 (e.g., the UE 115-b) may act as a proxy receiver for the UE 115-a during instances of deafness at the UE 115-a. For example, the UE 115-a and the UE 115-b may communicate via PC5-RRC signaling and reach an agreement where the UE 115-b may act as a proxy receiver for the UE 115-a when the UE 115-a anticipates to be unable to perform high-quality reception (e.g., due to half-duplex deafness, narrow reception beam deafness, unavailable radio deafness, any other type of deafness, or a combination thereof). In the examples of FIGS. 2A-2C, the UE 115-a and the UE 115-b may agree on one or more active slots that the UE 115-b may perform proxy reception for PSCCH and PSSCH transmissions intended for the UE 115-a. For example, with reference to FIG. 2A, while the UE 115-a transmits data to the UE 115-b via sidelink channel 205-a, the UE 115-b may identify that the UE 115-c may be transmitting data to the UE 115-a and may request either NACK-only response or an ACK/NACK response from the UE 115-a. On behalf of the UE 115-a, the UE 115-b may transmit a NACK response message indicating to the UE 115-c that the UE 115-a may not have received the sidelink message.

In some implementations, the UE 115-b may be further configured to decode the sidelink message transmitted by the UE 115-c via sidelink channel 205-a. If the UE 115-b is successful in decoding the sidelink message (e.g., including a control message on a PSCCH and a corresponding data message on a PSSCH), the UE 115-b may operate in accordance with one of the following examples. In one example, the UE 115-b may transmit an ACK to the UE 115-c (e.g., or discontinuously transmit (DTX) for NACK-only cases) on behalf of the UE 115-a and relay the decoded sidelink data from the UE 115-c to the UE 115-a when the UE 115-a is no longer experiencing deafness. Further discussion of the UE 115-b transmitting to the UE 115-a on behalf of the UE 115-c are described herein, including with reference to FIG. 4. In another example, the UE 115-b may transmit a NACK to the UE 115-c, on behalf of the UE 115-a and participate in an SFN retransmission. For instance, the UE 115-b may act as a "helper UE" to the UE 115-c and perform an SFN-type retransmission to opportunistically flood the data previously transmitted by the UE 115-c to the UE 115-a. Further discussion of SFN retransmissions are described herein, including with reference to FIG. 5. In some examples, the proxy UE (e.g., the UE 115-b) may transmit an indication of the performed proxy reception to the intended recipient of a sidelink message (e.g., the UE 115-a).

In some implementations, the UE 115-a and the UE 115-b may determine for the UE 115-b to act as a proxy receiver based on operating in accordance with an opportunistic proxy reception mode where the UE 115-b acts as a proxy receiver for the UE 115-a in slots where it detects SCI transmitted by the UE 115-a. Further discussion of opportunistic proxy reception is described herein, including with reference to FIG. 3A. Additionally or alternatively, the UE 115-a and the UE 115-b may determine for the UE 115-b to act as a proxy receiver based on preconfiguring a set of slots on a periodic or semi-periodic basis where the UE 115-b may act as the proxy receiver. Further discussion of a preconfigured proxy reception is described herein, including with reference to FIG. 3B.

By leveraging cooperation between the UE 115-a and the UE 115-b via proxy reception, the UEs 115 may be able to benefit from one or more system advantages. For example, the UE 115-a may experience a decrease in signaling overhead, a decrease in latency, and a decrease in negative impacts resulting from instances of deafness. The UE 115-c may conserve power resulting from increased retransmissions, failed transmissions, etc. Further, the overall sidelink network may benefit from an increase in overall network efficiency.

Figure 3A:
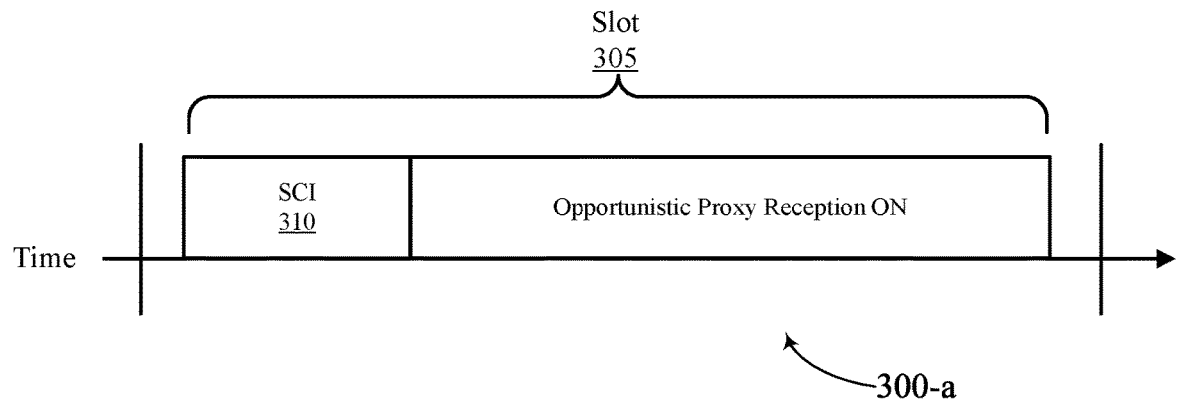
FIGS. 3A and 3B illustrates an example of a sidelink transmission timelines that supports device cooperation for mitigation of deafness in sidelink communications in accordance with aspects of the present disclosure.
Figure 3B:
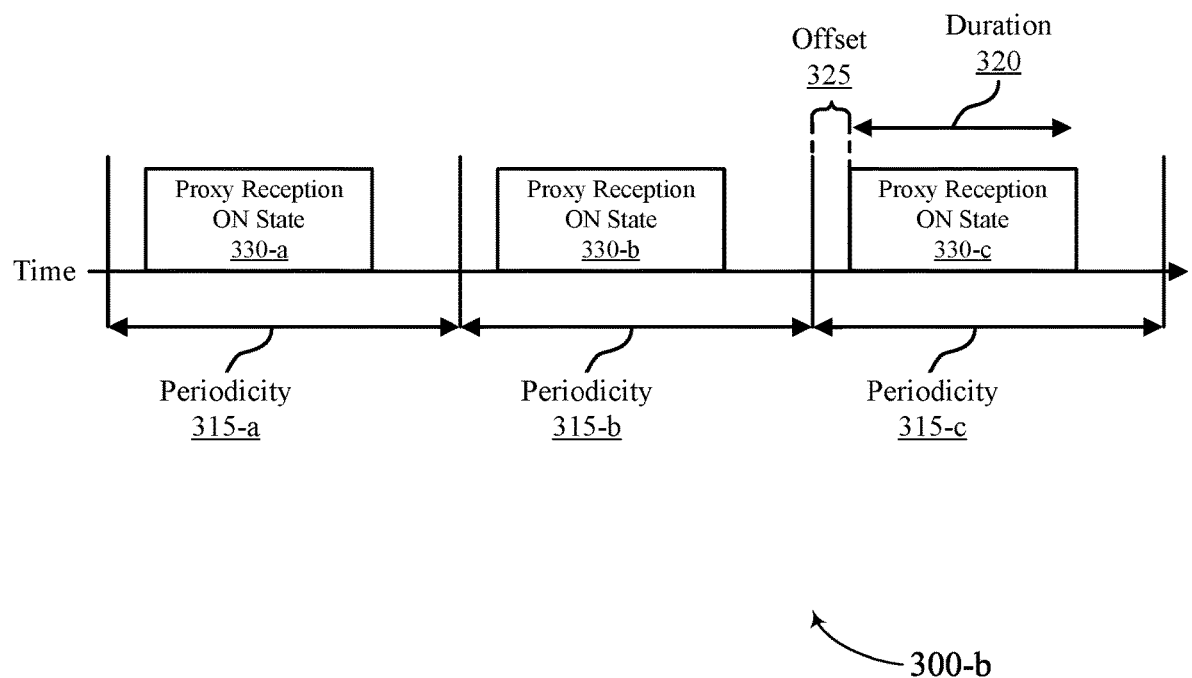

FIGS. 3A and 3B illustrate respective examples of a sidelink transmission timelines 300-a and 300-b that support device cooperation for mitigation of deafness in sidelink communications in accordance with aspects of the present disclosure. The sidelink transmission timelines 300 may implement or be implemented by one or more aspects of the wireless communications system 100 and wireless communications systems 200. For example, the sidelink transmission timelines 300 may include sidelink information communicated between a first UE 115 (e.g., the UE 115-a of FIG. 2) and a second UE 115 (e.g., the receiving UE 115-b of FIG. 2) to determine one or more slots in which the receiving a UE 115 may serve as a proxy receiver for the first UE 115. The first UE 115 and the second UE 115 may operate in accordance with opportunistic proxy reception as illustrated in FIG. 3A or may operate in accordance with a preconfigured proxy reception as illustrated in FIG. 3B.

With reference to FIG. 3A, the first UE 115 and the second UE 115 may operate in accordance with an opportunistic proxy reception. For example, the first UE 115 and the second UE 115 may agree on performing opportunistic proxy reception in slots where the second UE 115 detects an SCI transmitted from the first UE 115. As illustrated in FIG. 3A, the first UE 115 may receive, during a slot 305, a SCI 310 from the first UE 115. For instance, the second UE 115 may detect the SCI 310 which may include a sidelink L1 source ID or some other form of identification that may indicate that the SCI 310 is transmitted by the first UE 115. In some examples, (e.g., as established by coordinating first UE and second UE in the coordination agreement), the first UE may communicate unicast signaling with the second UE, and may operate in a half-duplex mode. Based on the SCI 310, the second UE 115 may operate as a proxy receiver for the first UE 115 for the slot 305 the SCI 310 was received during.

In some examples, a UE 115 may perform opportunistic proxy reception if it is the intended UE 115 of a unicast transmission from the first UE 115. For example, the SCI transmitted by the first UE 115 may include a sidelink L1 destination ID or another form of identification that may identify the second UE 115 as the intended target for the SCI transmission. If the second UE 115 identifies that the SCI is intended for another UE 115, the second UE 115 may determine to refrain from performing opportunistic proxy reception during the associated slot 305. The second UE may be highly likely to detect and receive the SCI 310 when the second UE 115 is the intended receiver of the unicast transmission from the first UE 115. Additionally or alternatively, the second UE 115 may perform opportunistic proxy reception the SCI 310 indicates cooperation from the second UE 115. For example, the first UE 115 may transmit an SCI intended for a UE 115 other than the second UE 115 that may include a field that indicates to the second UE 115 to perform opportunistic reception during the slot 305 associated with the SCI transmission. While in this example the second UE 115 is not the intended recipient of the SCI, the second UE 115 has a relatively high probability of detecting the SCI when it is in vicinity (e.g., a geographic coverage area) of the first UE 115.

With reference to FIG. 3B, the first UE 115 and the second UE 115 may operate in accordance with a preconfigured proxy reception. For example, the first UE 115 and the second UE 115 may agree on a preconfigured set of "deaf" slots where the second UE 115 may perform proxy reception for the first UE 115. In some examples, the preconfigured deaf slots may include a slot in which the first UE 115 may transmit information to the second UE 115 that follows a transmission/reception pattern that may be included in a unicast connection establishment between the first UE 115 and the second UE 115. In some examples, the preconfigured deaf slots may also include a slot during which the first UE 115 may tune its associated radio to another band using a tuning pattern that may be included in the unicast connection establishment between the first UE 115 and the second UE 115. By dynamically tuning the radio, the first UE 115 may benefit from frequency diversity (e.g., an approximate frequency bandwidth of 1.7 GHz where the associated radio may have an operating bandwidth ≤100 MHz) which may be useful for sidelink communication deployment for frequencies greater than 6 GHz. In some examples, the preconfigured deaf slots may also include information indicating that the first UE 115 may be operating in accordance with an OFF mode of a DRX mode.

As such, during the preconfigured proxy reception agreement between the first UE 115 and the second UE 115, the UEs 115 may further specify periodic patterns associated with the proxy reception. For example, as illustrated in FIG. 3B, the occurrence of the proxy reception on state 330 may have an associated periodicity 315 which may establish the frequency at which the second UE 115 may act as a proxy receiver for the first UE 115. In some examples, each periodicity 315 of the proxy reception on state 330 may also have an associated duration 320 (e.g., a number of slots) in which the second UE 115 acts as the proxy receiver and an offset 325 relative to start of each iteration of the periodicity 315. Periodicity 315, duration 320, offset 325, or any combination thereof, may be defined in the unicast connection establishment between the first UE 115 and the second UE 115, a cooperation agreement negotiated between the first UE 115 and the second UE 115, or the like.

In some cases, the cooperation agreement between the first UE 115 and the second UE 115 may further specify a set of reception beams that may be used by the second UE 115 for performing proxy reception during a deaf slot. For example, it may be assumed that the first UE 115 and the second UE 115 may have an advanced beam alignment between them. For example, during initial procedures for setting up sidelink communications between the first UE 115 and the second UE 115, the two UEs 115 may identify and align respective transmission/reception beams for communication and further identify the coverage areas for each of those respective beams. For instance, while acting as a proxy receiver for the first UE 115, the second UE 115 may utilize a wider beam type to increase odds of reception from a third UE 115 that is attempting to communicate with the first UE 115. In some cases, while the second UE 115 is using the wider beam to receive sidelink messages intended for the first UE 115, the first UE 115 may use a narrow beam to receive sidelink messages from a fourth UE 115.

In some examples, the cooperation agreement between the second UE 115 and the first UE 115 may include further specifications with reference to a third UE 115 attempting to communicate with the first UE 115. The cooperation agreement may indicate that the second UE is to act as proxy UE for the first UE if the third UE is identified as the transmitting device. For example, during the cooperation agreement the first UE 115 and the second UE 115 may determine a set of one or more conditions that a sidelink message transmitted by the third UE 115 may satisfy. If one or more of the conditions are satisfied (e.g., if the second UE detects a sidelink message that satisfies one or more of the conditions, or is from the third UE), then the second UE may act as proxy for the first UE. For example, determining that the conditions are satisfied may include identifying an L1 ID from a specific set of L1 IDs agreed upon in the cooperation agreement, determining that the sidelink message is of a cast type identified in the cooperation agreement (e.g., unicast, groupcast, broadcast), determining that the sidelink message is associated with a sidelink priority level identified in the cooperation agreement, determining that the sidelink message is associated with a number of retransmissions identified in the cooperation agreement (e.g., zero or one), determining that the sidelink message includes a flag indicating a packet delay budget threshold, determining that the third UE 115 is located in a geographic coverage area associated with the time resource, or any combination thereof.

Figure 4:
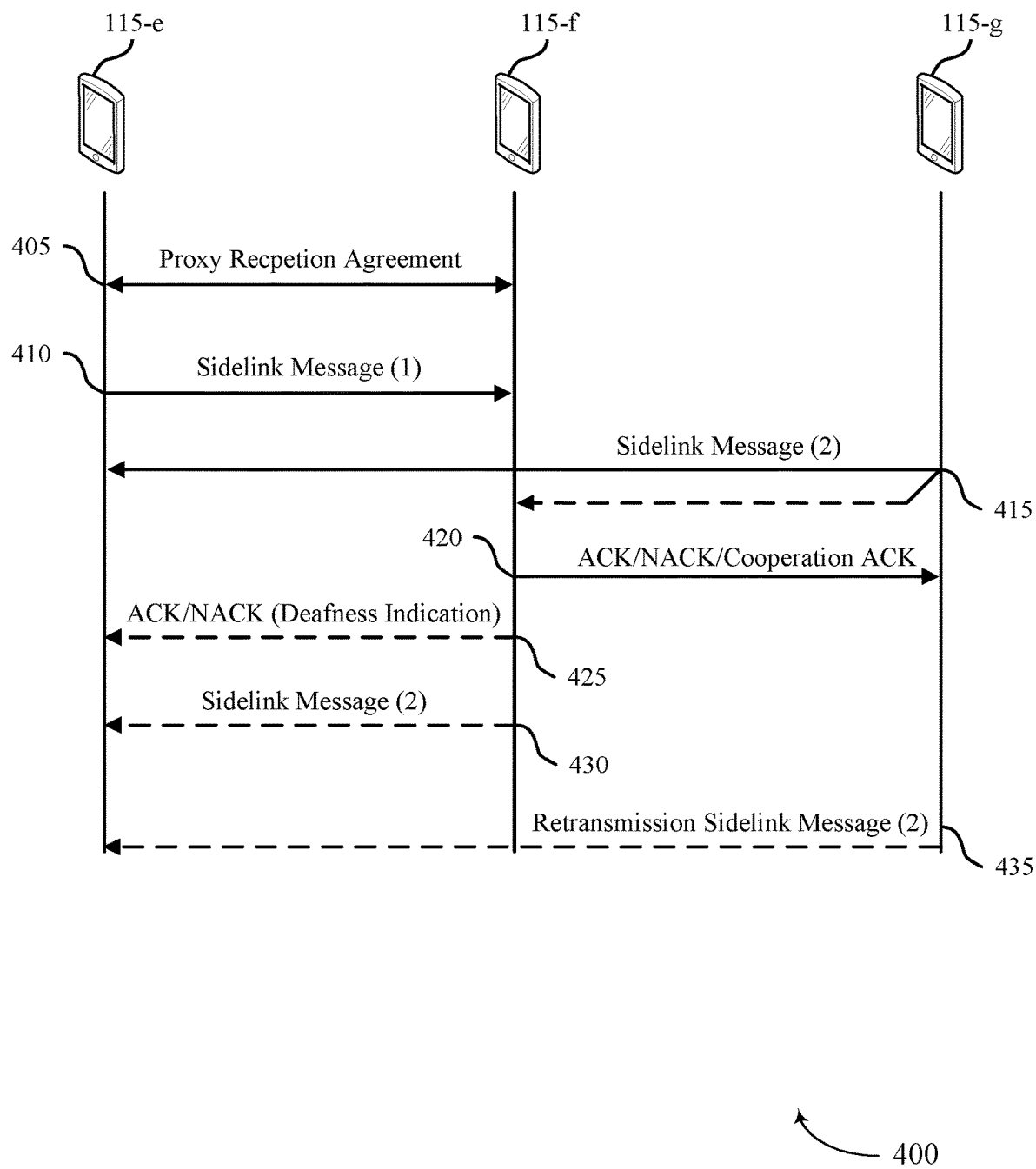
FIG. 4 illustrates an example of a process flow that supports device cooperation for mitigation of deafness in sidelink communications in accordance with aspects of the present disclosure.
Figure 5:
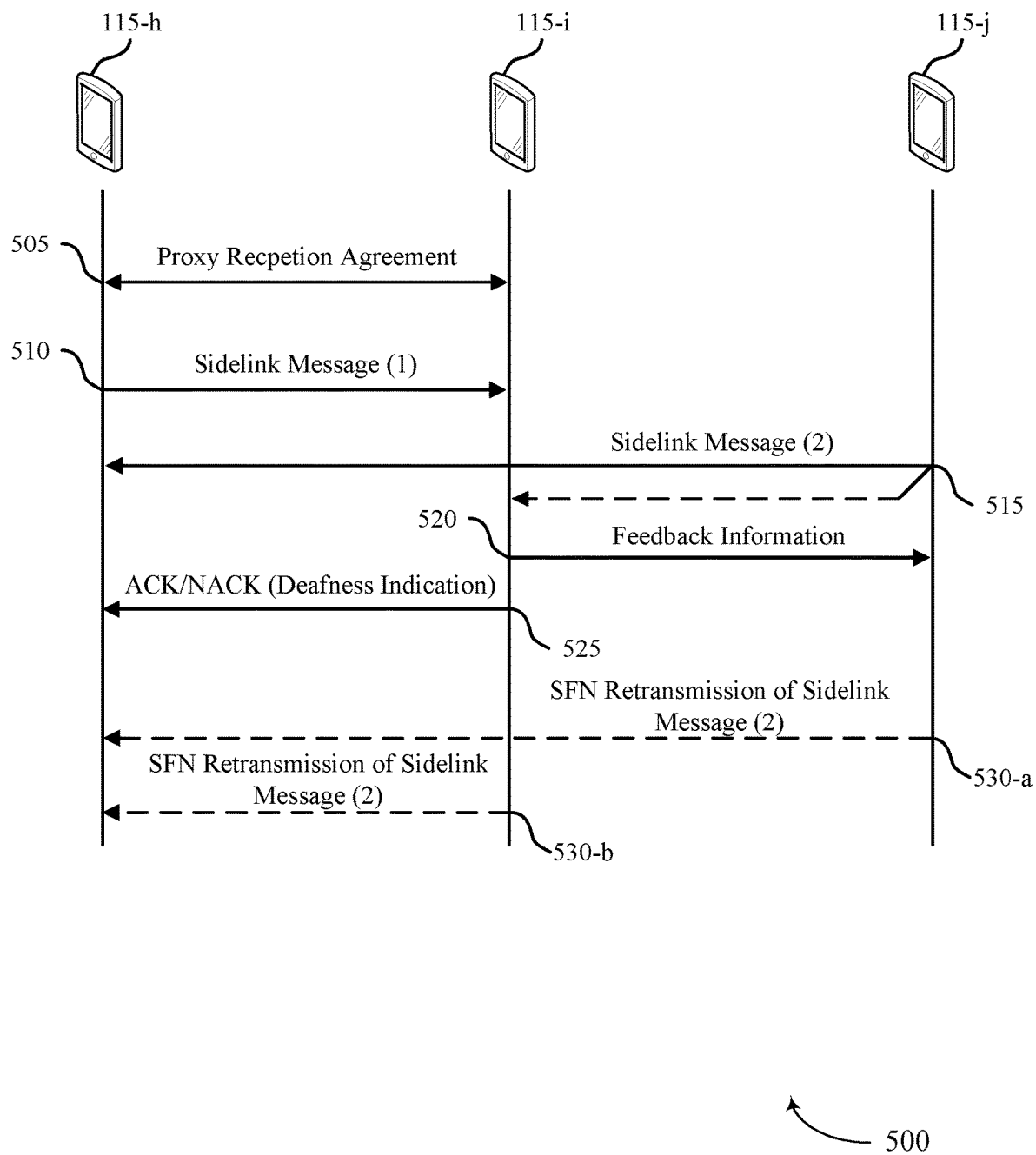
FIG. 5 illustrates an example of a process flow that supports device cooperation for mitigation of deafness in sidelink communications in accordance with aspects of the present disclosure.

Further discussion of the second UE 115 acting as a proxy device for the first UE 115 is described herein including with reference to FIGS. 4 and 5. For example, FIG. 4 may include further discussion of the second UE 115 transmitting to the first UE 115 one or more sidelink messages on behalf of a third UE and FIG. 5 may include further discussion of the second UE 115 and the third UE operating in accordance with an SFN-manner retransmission of sidelink messages intended for the first UE 115 during deaf slots.

FIG. 4 illustrates an example of process flow 400 that supports device cooperation for mitigation of deafness in sidelink communications in accordance with aspects of the present disclosure. In some examples, process flow 400 may implement aspects of wireless communications system 100, wireless communications systems 200, sidelink transmission timelines 300, or a combination thereof. Process flow 400 includes a UE 115-e, a UE 115-f, and UE 115-g which may be examples of UEs 115 as described with reference to FIGS. 1-3. Alternative examples of the following may be implemented, where some steps are performed in a different order than described or are not performed at all. In some cases, steps may include additional features not mentioned below, or further steps may be added. In addition, while process flow 400 shows processes between three UEs 115, it should be understood that these processes may occur between any number of network devices.

At 405, the UE 115-f and the UE 115-e may establish a proxy reception agreement, indicating for the UE 115-f to act as a proxy device for the UE 115-e during one or more deaf slots in which the UE 115-e may be unable to receive signaling from another network device (e.g., the UE 115-g). For example, the UE 115-g or another network device (not depicted in FIG. 4) may transmit one or more messages to the UE 115-e, such as data messages via a PSSCH, control messages via a PSCCH, or feedback information using a physical sidelink feedback channel (PSFCH). In some examples, the one or more deaf slots may be associated with step 410, in which the 115-e may transmit one or more sidelink messages to the UE 115-f in a half-duplex mode, and may therefore experience half-duplexing deafness. Techniques described herein may be performed for any type of deafness. In some examples, the proxy reception agreement may be control signaling designating a set of periodic time resources including the time resource for the UE 115-f to act as the proxy device for the UE 115-e. In some examples, during the proxy reception agreement the UE 115-f may also receive RRC signaling via a sidelink channel including a set of parameters, the set of parameters including a periodicity of the set of periodic time resources, an offset value for the set of periodic time resources, a length indicator for each of the rely time resources, or any combination thereof. In some examples, the proxy reception agreement may consist of performing a handshake procedure with the UE 115-e to establish a cooperation agreement designating one or more time resources, one or more conditions, one or more beams, or any combination thereof, for which the UE 115-f may act as the proxy device for the UE 115-e. Further discussion of the types of proxy reception agreements and the information enclosed are described herein including with reference to FIGS. 3A and 3B.

In some examples, the UE 115-e may initiate the proxy reception agreement (e.g., may transmit a request message to the UE 115-f indicating a request to establish a proxy reception agreement). In some examples, the UE 115-f may initiate the proxy reception agreement (e.g., may transmit an indication of capability information indicating that the UE 115-f is capable of performing a proxy reception role on behalf of the UE 115-e). In some examples, the UEs 115-e may exchange signaling negotiating the details or conditions of the proxy reception agreement. For example, the UE 115-e may indicate a set of parameters, conditions, timelines, resources, or the like, during which the UE 115-f is to act as a proxy for the UE 115-e. The UE 115-f may receive such an indication, and may down select a subset of the set of parameters, conditions, timelines, resources, or the like, or may propose alternative sets of parameters, conditions, timelines, resources, or the like, to the UE 115-e. The UEs 115 may eventually agree on the conditions of the proxy reception agreement, and one or both of the UE 115-e and the UE 115-f may transmit a confirmation of the proxy reception agreement.

At 410, the UE 115-f may receive from the UE 115-e a first sidelink message using a first sidelink channel. In some examples, during the reception of the first sidelink message, the UE 115-f may act as a proxy device for the UE 115-e as governed by the proxy reception agreement established at step 405. At 415, which may occur in the same slot as step 410, the UE 115-f may identify a second sidelink message from the UE 115-g that may be addressed to the UE 115-e.

At 420, the UE 115-f may transmit feedback information on behalf of the UE 115-e to the UE 115-g indicating unsuccessful reception of the second sidelink message. If the second sidelink message requested a HARQ response, the UE 115-f may send a NACK response to the UE 115-g on behalf of the UE 115-e to trigger a retransmission attempt at the UE 115-g. If the second sidelink message was an example of a groupcast PSSCH requesting NACK-only response, the UE 115-f may send a NACK response to the UE 115-g on behalf of the UE 115-e. If the second sidelink message was an example of a groupcast PSSCH requesting an ACK/NACK response, the UE 115-f may transmit a PSFCH sequence to the UE 115-g that may be associated with a member ID for the UE 115-e used in the groupcast. If the second sidelink message was an example of a unicast PSSCH requesting a HARQ response, the UE 115-f may send a NACK response to the UE 115-g on behalf of the UE 115-e. In some examples, the UE 115-f may be configured with a maximum number of proxy receptions it may receive from the UE 115-g. This may avoid confusing radio link failure maintenance.

In some examples, the UE 115-f may be able to decode a data message associated with the second sidelink message from the UE 115-g. In such examples, the UE 115-f may respond to the UE 115-g with an ACK message on behalf of the UE 115-e. If the second sidelink message was an example of a groupcast PSSCH requesting NACK-only response, the UE 115-f may send a discontinuous transmission (DTX) to the UE 115-g indicating successful reception of the second sidelink message on behalf of the UE 115-e.

Based on the UE 115-e and the UE 115-f reaching a cooperation agreement, the UE 115-f may inform other UEs 115 (e.g., the UE 115-g) that are attempting to communicate with the UE 115-e of the cooperation agreement. With this indication of the cooperation agreement, the UE 115-g may request SCI for HARQ response from both the intended receiver of the second uplink message (e.g., the UE 115-e) and the cooperation partner (e.g., the UE 115-f). In some examples, the UE 115-g may specify respective PSFCH resources like for groupcast with the UE 115-e and the UE 115-f as group members. Alternatively, the UE 115-g may specify an ACK-only resource (e.g., a cooperation ACK as depicted in FIG. 4) for each of the cooperation partners (e.g., the UE 115-f). If the UE 115-f successfully decodes the second uplink message, it may send the cooperation ACK to the UE 115-g; otherwise the UE 115-f may transmit a NACK to using PSFCH resources to the UE 115-g. The cooperation ACK may indicate to the UE 115-g that the UE 115-f has successfully decoded the second sidelink message such that the UE 115-g may handover the job of transmitting the second sidelink channel to the UE 115-f. Alternative to the cooperation ACK, the UE 115-g may announce an ability for receiving a multi-bit PSFCH from the UE 115-e and the UE 115-f that may include information associated with the cooperation agreement.

At 425, the UE 115-f may transmit a deafness indication to the UE 115-e regarding the second sidelink message. In some examples, the deafness indication may indicate that the UE 115-f received the second sidelink channel transmitted by the UE 115-g. In some examples of deafness (e.g., the example of process flow 400, in which the UE 115-e experiences half-duplex deafness), the UE 115-e may request for the UE 115-f to carry an additional bit over a PSFCH transmission (e.g., using an index modulation) to indicate the proxy reception operation that occurred between the UE 115-f and the UE 115-g. In the example of an alternative form of deafness at the UE 115-e (e.g., narrow-reception-beam deafness or un-available radio deafness) the UE 115-e may include in the proxy reception agreement, at 405, further details for when and where (e.g., time resources, frequency resources, spatial resources, or the like) it is able to receive the deafness indication from the UE 115-e. In some examples, the UE 115-e may indicate for the UE 115-f to transmit the deafness indication via MAC-CE. In such examples, the MAC-CE may include additional information such as a slot index, the L1 source ID of the UE 115-g, the priority of the second sidelink message, the reserved retransmission opportunities for the UE 115-g (e.g., if there were any), a request for CSI feedback, among other examples.

In some examples, the UE 115-f may commit to the UE 115-e (e.g., via the proxy reception agreement), to further decode received sidelink message (e.g., on a PSSCH) after identifying (e.g., in a deaf slot) a PSSCH transmitted by the UE 115-g toward the UE 115-e. In such examples, the UE 115-f may successfully decode the second sidelink message received at 415, and may respond to the UE 115-g with an ACK message at 420 on behalf of the first UE 115-e (or a DTX for a groupcast PSSCH requesting a NACK-only response). The UE 115-f may also forward the decoded sidelink message to the UE 115-e at 430. In some examples, the UE 115-f may forward the decoded message on specific designated sidelink resources for forwarding the decoded sidelink message. In some examples, the UE 115-e may indicate the designated resources (e.g., the when and where to relay the decoded sidelink message) to the UE 115-f (e.g., in the proxy reception agreement). In some examples, the UE 115-e may indicate a trigger to the UE 115-f for the UE 115-f to activate a conditionally available slot to transmit (e.g., relay) the deafness indication at 425 or the decoded sidelink message at 430, or both, to the UE 115-e. For example, the UE 115-e may specify the trigger as a PSFCH or a mini-slot that may have been previously committed to performing other reception operations with the UE 115-f. Such a trigger may activate the conditionally available resources for relaying the deafness indication at 425 or the decoded message at 430. The trigger and conditional availability may be used to minimize resource inefficiency for beamformed reception.

At 430, the UE 115-f may relay the second sidelink message to the UE 115-e on behalf of the UE 115-g. This relay action may occur in cases in which the UE 115-f was able to successfully decode the second sidelink message and transmitted an ACK or a cooperation ACK to the UE 115-g on behalf of the UE 115-e. In some examples, the UE 115-f may also carry the MAC-CE while relaying the second sidelink message to the UE 115-e. At 435, the UE 115-g may perform a retransmission of the second sidelink channel. This relay action may occur in cases in which the UE 115-f was unable to or refrained from decoding the second sidelink message or transmitted a NACK to the UE 115-g on behalf of the UE 115-e triggering retransmission. For instance, instead of decoding and forwarding the second sidelink message, the UE 115-f may transmit a NACK message at 420, triggering retransmission by the UE 115-g. In such examples, despite failing to receive the second sidelink message at 415, the UE 115-e may successfully receive the second sidelink channel retransmission at 435.

FIG. 5 illustrates an example of process flow 500 that supports device cooperation for mitigation of deafness in sidelink communications in accordance with aspects of the present disclosure. In some examples, process flow 500 may implement aspects of wireless communications system 100, wireless communications systems 200, sidelink transmission timelines 300, or a combination thereof. Process flow 500 includes a UE 115-h, a UE 115-i, and UE 115-j which may be examples of UEs 115 as described with reference to FIGS. 1-3. Alternative examples of the following may be implemented, where some steps are performed in a different order than described or are not performed at all. In some cases, steps may include additional features not mentioned below, or further steps may be added. In addition, while process flow 500 shows processes between three UEs 115, it should be understood that these processes may occur between any number of network devices.

At 505, the UE 115-i and the UE 115-h may establish a proxy reception agreement, indicating for the 115-i to act as a proxy device for the UE 115-h during one or more deaf slots in which the UE 115-h may be unable to receive signaling from another network device (e.g., the UE 115-j). For example, the one or more deaf slots may be associated with step 410, in which the 115-e may transmit one or more sidelink messages to the 115-i in a half-duplex mode, and may therefore experience half-duplexing deafness. Techniques described herein may be performed for any type of deafness. In some examples, the proxy reception agreement may be control signaling designating a set of periodic time resources including the time resource for the 115-i to act as the proxy device for the UE 115-h. In some examples, during the proxy reception agreement the 115-i may also receive RRC signaling via a sidelink channel including a set of parameters, the set of parameters including a periodicity of the set of periodic time resources, an offset value for the set of periodic time resources, a length indicator for each of the rely time resources, or any combination thereof. In some examples, the proxy reception agreement may consist of performing a handshake procedure with the UE 115-*h* to establish a cooperation agreement designating one or more time resources, one or more conditions, one or more beams, or any combination thereof, for which the 115-*i* may act as the proxy device for the UE 115-*h*. Further discussion of the types of proxy reception agreements and the information enclosed are described herein including with reference to FIGS. 3A and 3B.

In some examples, the UE 115-*h* may initiate the proxy reception agreement (e.g., may transmit a request message to the 115-*i* indicating a request to establish a proxy reception agreement). In some examples, the 115-*i* may initiate the proxy reception agreement (e.g., may transmit an indication of capability information indicating that the 115-*i* is capable of performing a proxy reception role on behalf of the UE 115-*h*). In some examples, the UEs 115-*e* may exchange signaling negotiating the details or conditions of the proxy reception agreement. For example, the UE 115-*h* may indicate a set of parameters, conditions, timelines, resources, or the like, during which the 115-*i* is to act as a proxy for the UE 115-*h*. The UE 15-*f* may receive such an indication, and may down select a subset of the set of parameters, conditions, timelines, resources, or the like, or may propose alternative sets of parameters, conditions, timelines, resources, or the like, to the UE 115-*h*. The UEs 115 may eventually agree on the conditions of the proxy reception agreement, and one or both of the UE 115-*h* and the 115-*i* may transmit a confirmation of the proxy reception agreement. Further discussion of the types of proxy reception agreements and the information enclosed are described herein including with reference to FIGS. 3A and 3B.

At 510, the UE 115-*i* may receive from the UE 115-*h* a first sidelink message. In some examples, during the reception of the first sidelink channel, the UE 115-*i* may act as a proxy device for the UE 115-*h* as configured by the proxy reception agreement at step 505. At 515, which may occur in the same slot as step 510, the UE 115-*i* may identify a second sidelink message from the UE 115-*j* that may be intended for the UE 115-*h*.

In some examples, the UE 115-*i* may successfully decode the second sidelink message at 515. Having successfully decoded the second sidelink transmission, the UE 115-*i* may transmit feedback information to the UE 115-*j*. For instance, the UE 115-*i* may transmit a NACK message at 520 (e.g., when the UE 115-*j* is inviting an SFN-manner retransmission over a reserved resource to the UE 115-*h*. In some examples, level 2/level 3 (L2/L3) relaying (e.g., as described in greater detail with reference to FIG. 4) may rely on complicated cooperation agreements between UEs 115 (e.g., to establish or activate optional resources for ACKing or relaying decoded PSSCH transmissions). In some examples, a UE 115-*i* and a UE 115-*h* may establish a proxy reception agreement that is simpler, by relying on SFN-manner retransmission procedures. In some examples, retransmission in an SFN-manner may occur faster than relaying decoded sidelink messages according to a proxy reception agreement. For example, the slot for an SFN-manner retransmission may occur sooner than a next pre-configured slot for beamformed communication between the UE 115-*h* and the UE 115-*i*. In some examples, the UE 115-*i* may re-attempt relaying the decoded second sidelink message received at 515 (e.g., as described in greater detail with reference to FIG. 4) if the UE 115-*h* fails to correctly receive a retransmission of the second sidelink message in an SFN-manner retransmission slot. That is, of SFN-manner retransmission fails, then the UE 115-*i* may attempt to relay decoded sidelink transmissions in designated or optionally available sidelink resources as described in greater detail with reference to FIG. 4.

In some examples, to exploit the cooperation agreement established at 505, the UE 115-*j* may indicate (e.g., in an SCI message), that it can perform SFN-manner retransmissions upon request. In some examples, an SFN-manner retransmission may be an example of cooperative relaying which may involve both the UE 115-*i* and the UE 115-*j* relaying (or being allowed to relay) a retransmission of the second sidelink channel by using shared resources (e.g., SFN-type resources). During an SFN-manner retransmission, the UE 115-*i* and the UE 115-*j* may opportunistically flood the information of the second channel transmission to the UE 115-*h*.

In some examples, if the UE 115-*j* indicates SFN-retransmission capability in the initial transmission of the second PHY sidelink channel, the UE 115-*j* may carry control information for facilitating an SFN-manner retransmission, but may maintain flexibility as to whether to perform the SFN-manner retransmission or not. In some examples, the control information may include one or more characteristics for performing the SFN-retransmission such as one or more configured resources within a set of resources that may be utilized for the retransmission (e.g., a specific sub-channel, a specific slot, or in any other specific frequency resource, time resource, spatial resource, or combination thereof). In some examples, the UE 115-*j* may further specify a PSFCH resources that it will monitor to request for SFN-manner retransmissions (e.g., from the UE 115-*i*). Utilizing opportunistic cooperative relaying, via SFN-manner retransmission, may allow the UE 115-*i* and the UE 115-*j* to communicate sidelink signaling without performing beamforming alignment procedures, which may improve communication reliability, decrease signaling overhead, and decrease signaling latency for sidelink communications.

In such examples, the UEs 115-*i* may transmit, to the UE 115-*j*, feedback information. For example, the UE 115-*i* may transmit feedback information including a request to initiate an SFN manner retransmission of the second sidelink message. The UE 115-*i* may transmit such feedback information using resources indicated by the third UE 115-*j* (e.g., in the capability information or the second sidelink message at 515, or the like). Upon receiving such a request from the UE 115-*i*, the UE 115-*j* may perform an SFN-manner retransmission on demand. For example, at 530-*a*, the UE 115-*j* may transmit an SFN retransmission of the second sidelink message. At 530-*b*, the UE 115-*i* may also participate in the SFN retransmission of the second sidelink message. In some examples, both the UE 115-*i* and the UE 115-*j* may send a retransmission of the second sidelink message. In some examples, the UE 115-*i* may identify one or more resources associated with the SFN retransmission, and may transmit the decoded second sidelink channel message to the UE 115-*h* using the identified SFN retransmission resources. In some examples, the UE 115-*h* may receive at least a portion of the retransmission from the UE 115-*i*, at least a portion of the retransmission from the UE 115-*j*, or both, and may decode the retransmission accordingly (e.g., may combine portions of the retransmission received via the UE 115-*o* and the UE 115-*j* to decode the entire second sidelink transmission).

At 525, the UE may transmit a deafness indication to the UE 115-*e* regarding the second sidelink message. In some examples, the deafness indication may indicate that the UE 115-*i* received the second sidelink channel transmitted by the UE 115-*j*. The deafness indication may also indicate to the UE 115-*h* whether a request to perform an SFN-manner retransmission of the second sidelink channel has been initiated.

Figure 6:
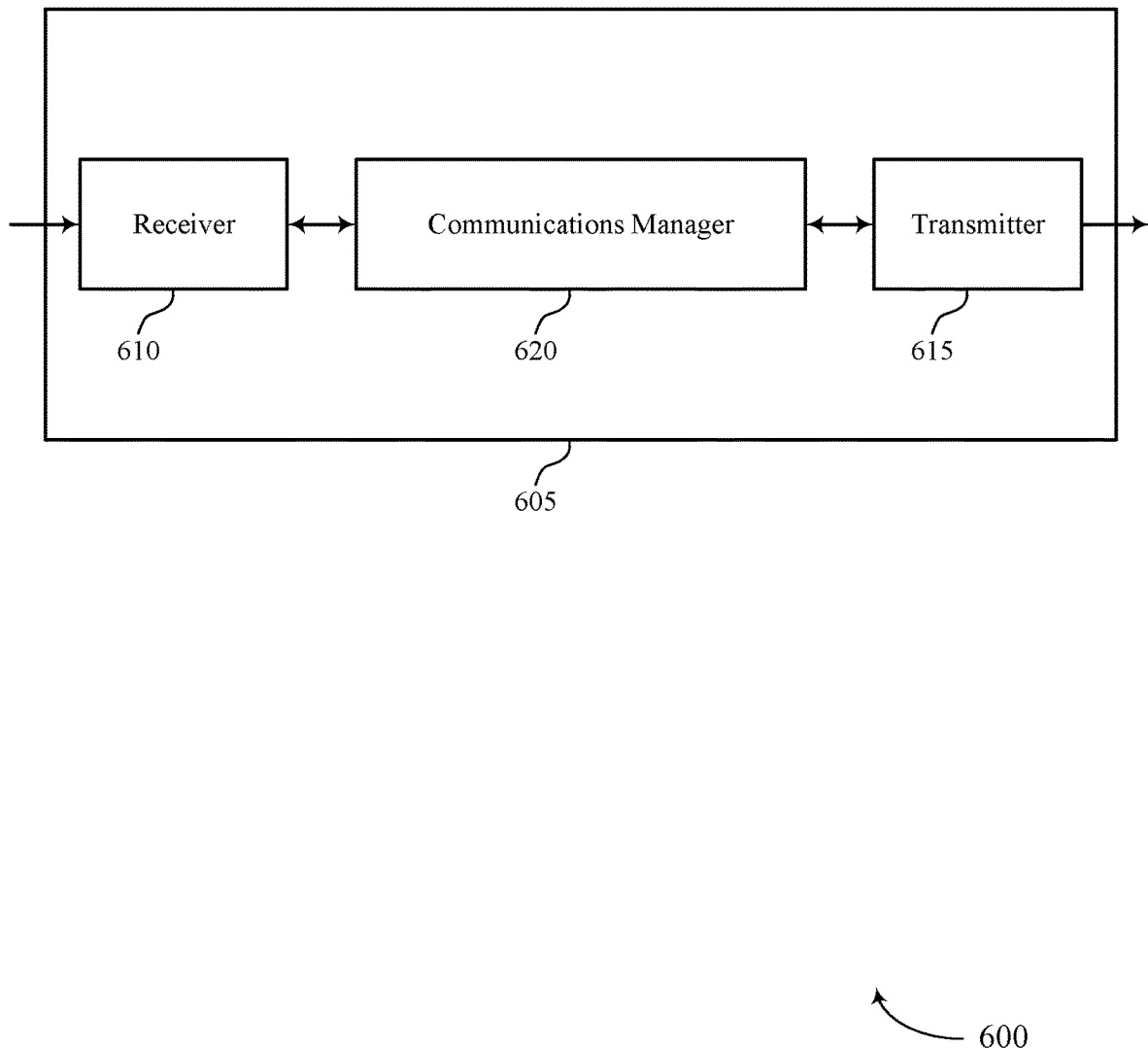
FIGS. 6 and 7 show block diagrams of devices that support device cooperation for mitigation of deafness in sidelink communications in accordance with aspects of the present disclosure.

FIG. 6 shows a block diagram 600 of a device 605 that supports device cooperation for mitigation of deafness in sidelink communications in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to device cooperation for mitigation of deafness in sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to device cooperation for mitigation of deafness in sidelink communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of device cooperation for mitigation of deafness in sidelink communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. For example, the communications manager 620 may be configured as or otherwise support a means for receiving, at the first UE and on a sidelink channel, a sidelink message directed to a second UE and transmitted by a third UE. The communications manager 620 may be configured as or otherwise support a means for determining that the first UE is to act as a proxy device for the second UE with respect to the sidelink message based on the sidelink message being received during a time resource designated for the first UE to act as the proxy device for the second UE. The communications manager 620 may be configured as or otherwise support a means for transmitting, to the third UE based on the determining, feedback information associated with the sidelink message.

Additionally or alternatively, the communications manager 620 may support wireless communications at a second UE in accordance with examples as disclosed herein. For example, the communications manager 620 may be configured as or otherwise support a means for determining that a first UE is to act as a proxy device for the second UE with respect to a sidelink message transmitted by a third UE to the second UE based on the sidelink message being transmitted by the third UE during a time resource designated for the first UE to act as the proxy device for the second UE. The communications manager 620 may be configured as or otherwise support a means for performing sidelink communications with the first UE or a fourth UE on a sidelink channel during the time resource. The communications manager 620 may be configured as or otherwise support a means for receiving, after the time resource and based on the determining, a retransmission of the sidelink message from the third UE, or the sidelink message forwarded by the second UE.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for enabling the device 605 to reduce processing overhead by supporting reliable sidelink communications between UEs 115 without performing beamforming alignment procedures. Refraining from performing beamforming alignment may decrease resource consumption (e.g., power resources), increase device efficiency, and decrease latency. Additionally improving communication reliability using proxy devices may reduce the quantity of retransmissions performed for failed transmissions, reducing processing overhead and improving device efficiency.

Figure 7:
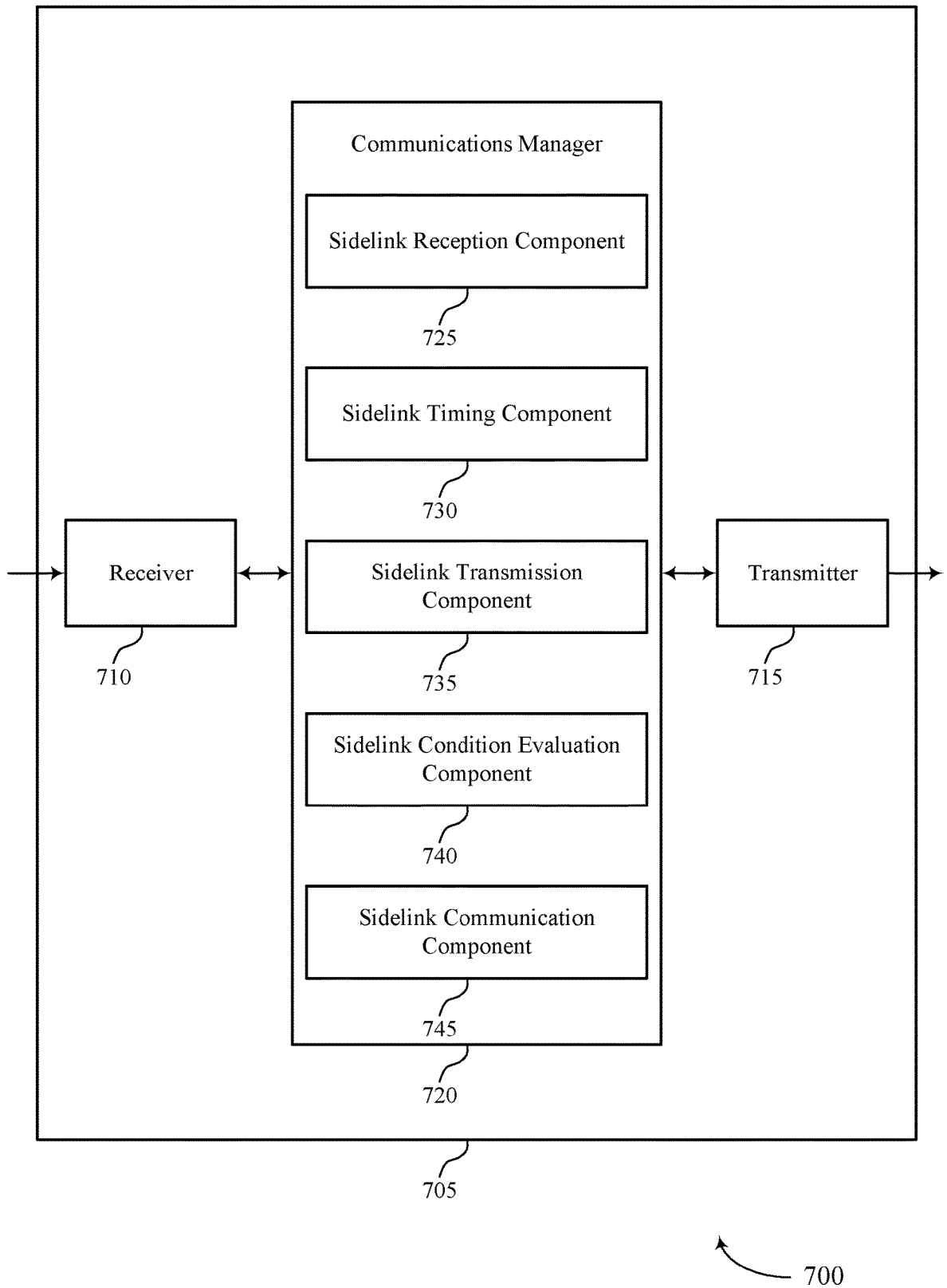

FIG. 7 shows a block diagram 700 of a device 705 that supports device cooperation for mitigation of deafness in sidelink communications in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to device cooperation for mitigation of deafness in sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to device cooperation for mitigation of deafness in sidelink communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of device cooperation for mitigation of deafness in sidelink communications as described herein. For example, the communications manager 720 may include a sidelink reception component 725, a sidelink timing component 730, a sidelink transmission component 735, a sidelink condition evaluation component 740, a sidelink communication component 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. The sidelink reception component 725 may be configured as or otherwise support a means for receiving, at the first UE and on a sidelink channel, a sidelink message directed to a second UE and transmitted by a third UE. The sidelink timing component 730 may be configured as or otherwise support a means for determining that the first UE is to act as a proxy device for the second UE with respect to the sidelink message based on the sidelink message being received during a time resource designated for the first UE to act as the proxy device for the second UE. The sidelink transmission component 735 may be configured as or otherwise support a means for transmitting, to the third UE based on the determining, feedback information associated with the sidelink message.

Additionally or alternatively, the communications manager 720 may support wireless communications at a second UE in accordance with examples as disclosed herein. The sidelink condition evaluation component 740 may be configured as or otherwise support a means for determining that a first UE is to act as a proxy device for the second UE with respect to a sidelink message transmitted by a third UE to the second UE based on the sidelink message being transmitted by the third UE during a time resource designated for the first UE to act as the proxy device for the second UE. The sidelink communication component 745 may be configured as or otherwise support a means for performing sidelink communications with the first UE or a fourth UE on a sidelink channel during the time resource. The sidelink reception component 725 may be configured as or otherwise support a means for receiving, after the time resource and based on the determining, a retransmission of the sidelink message from the third UE, or the sidelink message forwarded by the second UE.

Figure 8:
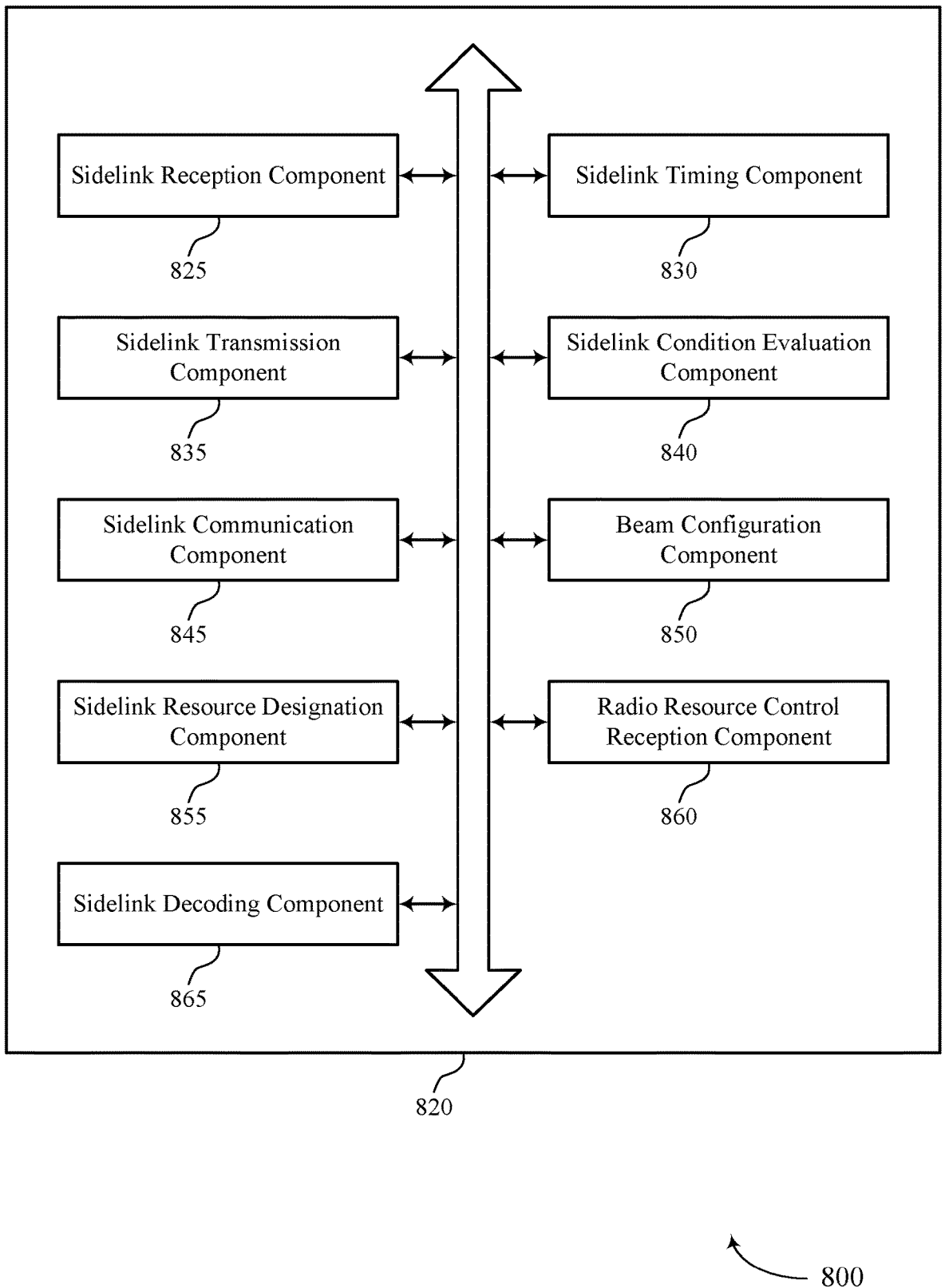
FIG. 8 shows a block diagram of a communications manager that supports device cooperation for mitigation of deafness in sidelink communications in accordance with aspects of the present disclosure.

FIG. 8 shows a block diagram 800 of a communications manager 820 that supports device cooperation for mitigation of deafness in sidelink communications in accordance with aspects of the present disclosure. The communications manager 820 may be an example of aspects of a communications manager 620, a communications manager 720, or both, as described herein. The communications manager 820, or various components thereof, may be an example of means for performing various aspects of device cooperation for mitigation of deafness in sidelink communications as described herein. For example, the communications manager 820 may include a sidelink reception component 825, a sidelink timing component 830, a sidelink transmission component 835, a sidelink condition evaluation component 840, a sidelink communication component 845, a beam configuration component 850, a sidelink resource designation component 855, a radio resource control reception component 860, a sidelink decoding component 865, or any combination thereof. Each of these components may communicate, directly or indirectly, with one another (e.g., via one or more buses).

The communications manager 820 may support wireless communications at a first UE in accordance with examples as disclosed herein. The sidelink reception component 825 may be configured as or otherwise support a means for receiving, at the first UE and on a sidelink channel, a sidelink message directed to a second UE and transmitted by a third UE. The sidelink timing component 830 may be configured as or otherwise support a means for determining that the first UE is to act as a proxy device for the second UE with respect to the sidelink message based on the sidelink message being received during a time resource designated for the first UE to act as the proxy device for the second UE. The sidelink transmission component 835 may be configured as or otherwise support a means for transmitting, to the third UE based on the determining, feedback information associated with the sidelink message.

In some examples, the sidelink reception component 825 may be configured as or otherwise support a means for receiving, from the second UE, control signaling designating a set of periodic time resources including the time resource for the first UE to act as the proxy device for the second UE, where determining that the first UE is to act as the proxy device for the second UE with respect to the sidelink message is based on receiving the control signaling.

In some examples, to support receiving the control signaling designating the set of periodic time resources for the first UE to act as the proxy device for the second UE, the radio resource control reception component 860 may be configured as or otherwise support a means for receiving radio resource control signaling via the sidelink channel including a set of parameters, the set of parameters including a periodicity of the set of periodic time resources, an offset value for the set of periodic time resources, a length indicator for each of the rely time resources, or any combination thereof.

In some examples, to support receiving the control signaling designating the set of periodic time resources for the first UE to act as the proxy device for the second UE, the sidelink reception component 825 may be configured as or otherwise support a means for receiving the control signaling designating of the set of periodic time resources during a cooperation establishment procedure for establishing a cooperation agreement.

In some examples, to support determining that the first UE is to act as the proxy device for the second UE with respect to the sidelink message, the beam configuration component 850 may be configured as or otherwise support a means for receiving, the sidelink message on a first beam of a set of beams, where the set of beams is associated with the first UE acting as the proxy device for the second UE.

In some examples, the beam configuration component 850 may be configured as or otherwise support a means for receiving, from the first UE an indication of the set of beams during a cooperation establishment procedure for establishing a cooperation agreement.

In some examples, the beam configuration component 850 may be configured as or otherwise support a means for determining that the second UE is located in a geographic coverage area associated with the first beam, where determining that the first UE is to act as the proxy device for the second UE with respect to the sidelink message is based on determining that the second UE is located in the geographic coverage area associated with the first beam.

In some examples, to support determining that the first UE is to act as the proxy device for the second UE with respect to the sidelink message, the sidelink condition evaluation component 840 may be configured as or otherwise support a means for determining that the sidelink message transmitted by the third UE satisfies one or more conditions.

In some examples, to support determining that the sidelink message satisfies the one or more conditions, the sidelink condition evaluation component 840 may be configured as or otherwise support a means for determining that a device identifier for the sidelink message is one of a set of device identifiers identified in a coordination agreement, determining that the sidelink message is a cast type identified in a coordination agreement, determining that the sidelink message is associated with a sidelink priority level identified in a coordination agreement, determining that the sidelink message is associated with a number of retransmissions identified in a coordination agreement, determining that the sidelink message includes a flag indicating a packet delay budget threshold, determining that the UE is located in a geographic coverage area associated with the time resource, or any combination thereof.

In some examples, to support determining that the first UE is to act as the proxy device for the second UE with respect to the sidelink message, the sidelink reception component 825 may be configured as or otherwise support a means for receiving the sidelink message as a unicast sidelink message addressed to the second UE during the time resource.

In some examples, the sidelink timing component 830 may be configured as or otherwise support a means for receiving, from the second UE, a sidelink control information message designating the time resource for the first UE to act as the proxy device for the second UE, where determining that the first UE is to act as the proxy device for the second UE with respect to the sidelink message is based on receiving the sidelink control information message.

In some examples, the sidelink transmission component 835 may be configured as or otherwise support a means for transmitting, to the second UE, an indication that the first UE received the sidelink message transmitted by the third UE during the time resource.

In some examples, to support transmitting the feedback information, the sidelink transmission component 835 may be configured as or otherwise support a means for transmitting a negative acknowledgement feedback message triggering a retransmission of the sidelink message.

In some examples, the sidelink condition evaluation component 840 may be configured as or otherwise support a means for refraining from decoding a data message associated with the sidelink message, where the sidelink message includes a sidelink control information message.

In some examples, the sidelink decoding component 865 may be configured as or otherwise support a means for decoding the sidelink message. In some examples, the sidelink transmission component 835 may be configured as or otherwise support a means for transmitting, to the first UE on sidelink resources associated with the triggered retransmission, the sidelink message.

In some examples, to support transmitting the feedback information, the sidelink transmission component 835 may be configured as or otherwise support a means for transmitting an acknowledgement feedback message to the third UE indicating that the second UE successfully received the sidelink message.

In some examples, the sidelink decoding component 865 may be configured as or otherwise support a means for decoding the sidelink message. In some examples, the sidelink transmission component 835 may be configured as or otherwise support a means for transmitting, to the first UE, an activation of a set of sidelink resources allocated for forwarding signaling received during the time resource. In some examples, the sidelink transmission component 835 may be configured as or otherwise support a means for transmitting, to the first UE on the set of sidelink resources, the sidelink message.

In some examples, the sidelink resource designation component 855 may be configured as or otherwise support a means for performing a handshake procedure with the first UE to establish a cooperation agreement designating one or more time resources including the time resource, one or more conditions, one or more beams, or any combination thereof, for which the UE is to act as the proxy device for the second UE.

Additionally or alternatively, the communications manager 820 may support wireless communications at a second UE in accordance with examples as disclosed herein. The sidelink condition evaluation component 840 may be configured as or otherwise support a means for determining that a first UE is to act as a proxy device for the second UE with respect to a sidelink message transmitted by a third UE to the second UE based on the sidelink message being transmitted by the third UE during a time resource designated for the first UE to act as the proxy device for the second UE. The sidelink communication component 845 may be configured as or otherwise support a means for performing sidelink communications with the first UE or a fourth UE on a sidelink channel during the time resource. In some examples, the sidelink reception component 825 may be configured as or otherwise support a means for receiving, after the time resource and based on the determining, a retransmission of the sidelink message from the third UE, or the sidelink message forwarded by the second UE.

In some examples, to support determining that the first UE is to act as the proxy device for the second UE, the sidelink resource designation component 855 may be configured as or otherwise support a means for performing a handshake procedure with the first UE to establish a cooperation agreement designating one or more time resources including the time resource, one or more conditions, one or more beams, or any combination thereof, for which the first UE is to act as the proxy device for the second UE.

In some examples, to support receiving the retransmission of the sidelink message, the sidelink reception component 825 may be configured as or otherwise support a means for receiving the retransmission of the sidelink message from the third UE.

In some examples, to support receiving the retransmission of the sidelink message, the sidelink reception component 825 may be configured as or otherwise support a means for receiving the retransmission of the sidelink message from the second UE via a set of sidelink resources allocated for retransmission of the sidelink message by the third UE.

Figure 9:
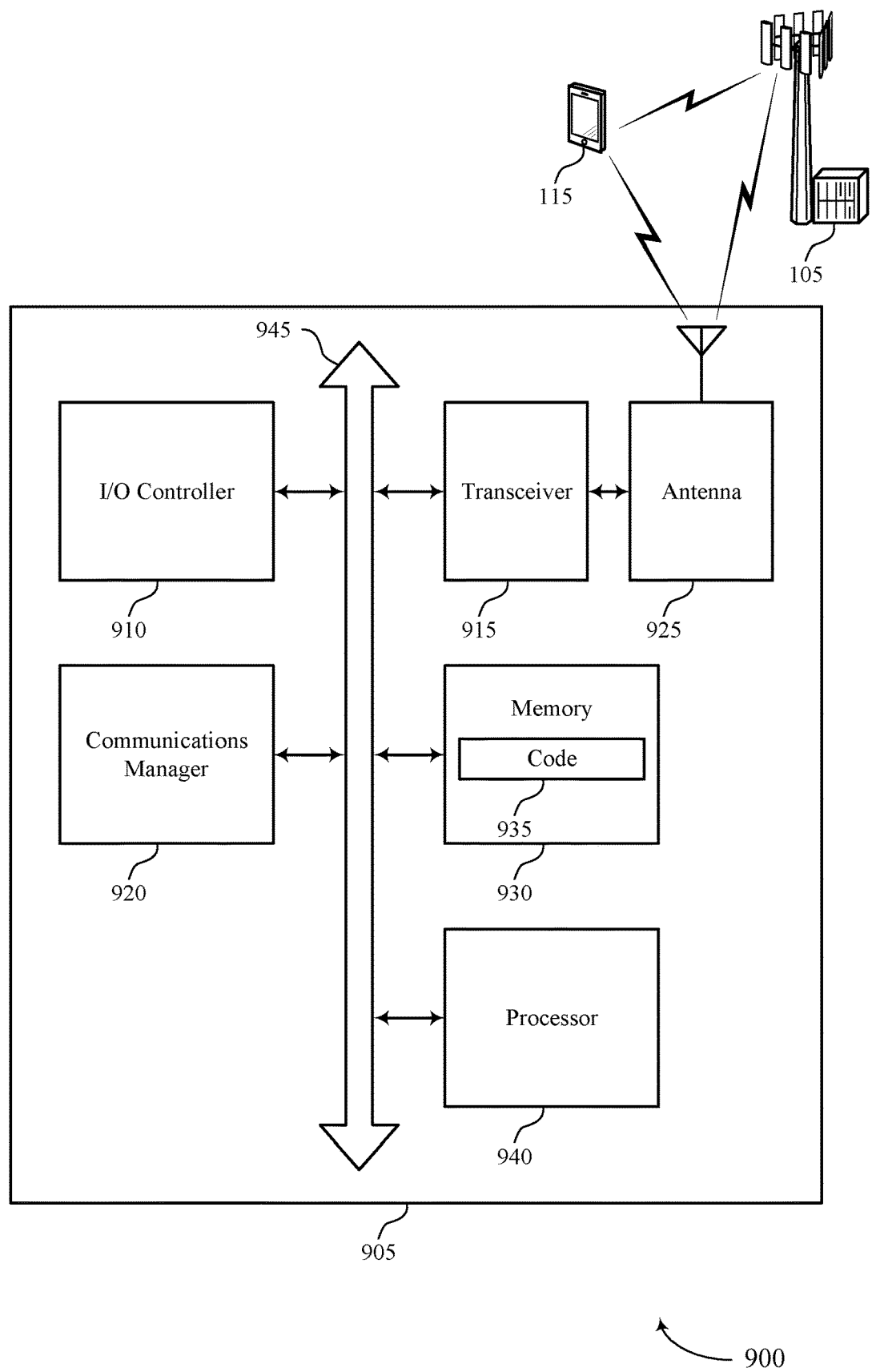
FIG. 9 shows a diagram of a system including a device that supports device cooperation for mitigation of deafness in sidelink communications in accordance with aspects of the present disclosure.

FIG. 9 shows a diagram of a system 900 including a device 905 that supports device cooperation for mitigation of deafness in sidelink communications in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925.

The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting device cooperation for mitigation of deafness in sidelink communications). For example, the device 905 or a component of the device 905 may include a processor 940 and memory 930 coupled with the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for receiving, at the first UE and on a sidelink channel, a sidelink message directed to a second UE and transmitted by a third UE. The communications manager 920 may be configured as or otherwise support a means for determining that the first UE is to act as a proxy device for the second UE with respect to the sidelink message based on the sidelink message being received during a time resource designated for the first UE to act as the proxy device for the second UE. The communications manager 920 may be configured as or otherwise support a means for transmitting, to the third UE based on the determining, feedback information associated with the sidelink message.

Additionally or alternatively, the communications manager 920 may support wireless communications at a second UE in accordance with examples as disclosed herein. For example, the communications manager 920 may be configured as or otherwise support a means for determining that a first UE is to act as a proxy device for the second UE with respect to a sidelink message transmitted by a third UE to the second UE based on the sidelink message being transmitted by the third UE during a time resource designated for the first UE to act as the proxy device for the second UE. The communications manager 920 may be configured as or otherwise support a means for performing sidelink communications with the first UE or a fourth UE on a sidelink channel during the time resource. The communications manager 920 may be configured as or otherwise support a means for receiving, after the time resource and based on the determining, a retransmission of the sidelink message from the third UE, or the sidelink message forwarded by the second UE.

By including or configuring the communications manager 920 in accordance with examples as described herein, the device 905 may support techniques for enabling a wireless device to communicate sidelink signaling with a second wireless device using a third wireless device acting as a proxy device, which may decrease signaling overhead, decrease latency, and increase overall device efficiency. Additionally by using proxy device relaying, the device 905 may support techniques for improved sidelink communication reliability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of device cooperation for mitigation of deafness in sidelink communications as described herein, or the processor 940 and the memory 930 may be otherwise configured to perform or support such operations.

Figure 10:
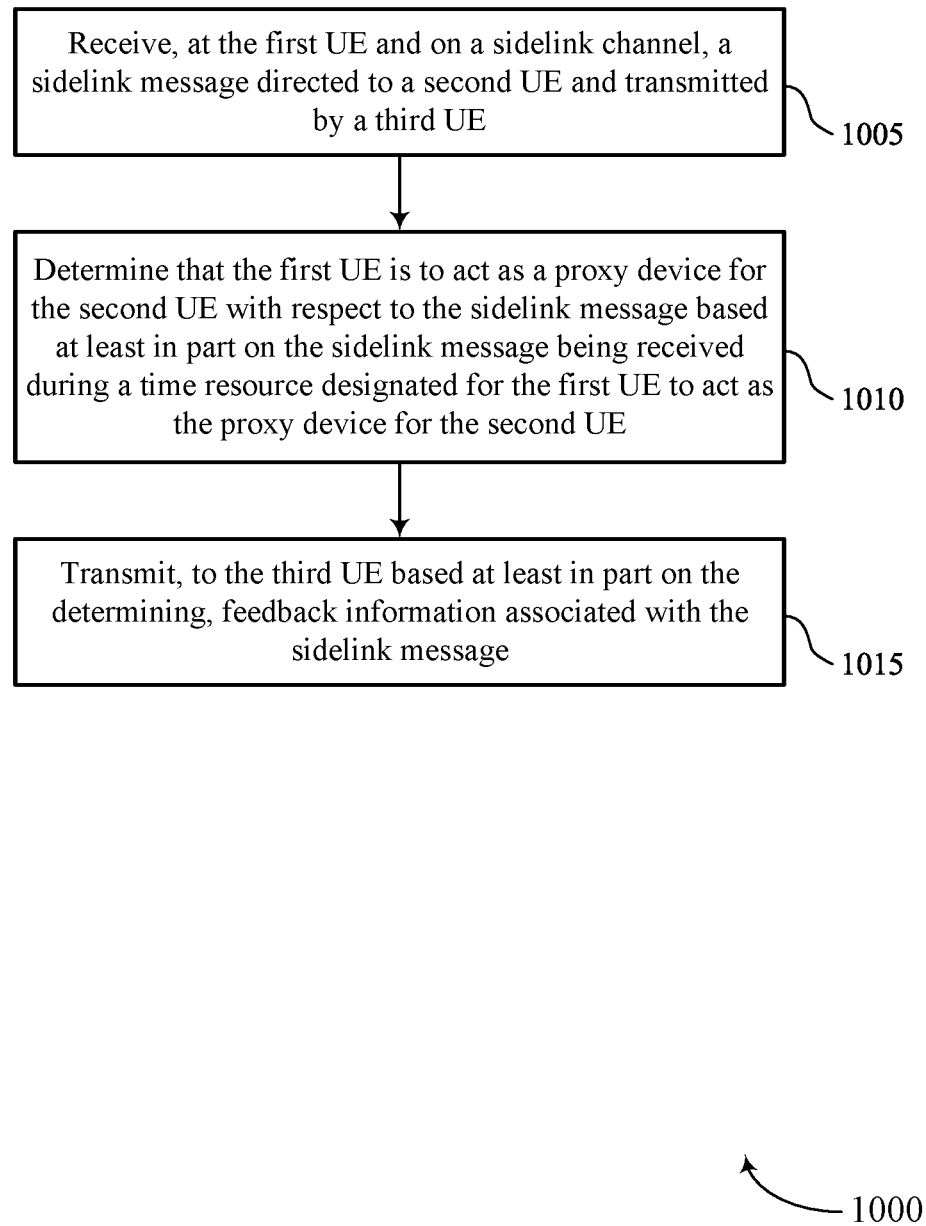
FIGS. 10 through 13 show flowcharts illustrating methods that support device cooperation for mitigation of deafness in sidelink communications in accordance with aspects of the present disclosure.

FIG. 10 shows a flowchart illustrating a method 1000 that supports device cooperation for mitigation of deafness in sidelink communications in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving, at the first UE and on a sidelink channel, a sidelink message directed to a second UE and transmitted by a third UE. The operations of 1005 may be performed in accordance with examples as disclosed herein. In some examples, aspects of the operations of 1005 may be performed by a sidelink reception component 825 as described with reference to FIG. 8.

At 1010, the method may include determining that the first UE is to act as a proxy device for the second UE with respect to the sidelink message based on the sidelink message being received during a time resource designated for the first UE to act as the proxy device for the second UE. The operations of 1010 may be performed in accordance with examples as disclosed herein. In some examples, aspects of the operations of 1010 may be performed by a sidelink timing component 830 as described with reference to FIG. 8.

At 1015, the method may include transmitting, to the third UE based on the determining, feedback information associated with the sidelink message. The operations of 1015 may be performed in accordance with examples as disclosed herein. In some examples, aspects of the operations of 1015 may be performed by a sidelink transmission component 835 as described with reference to FIG. 8.

Figure 11:
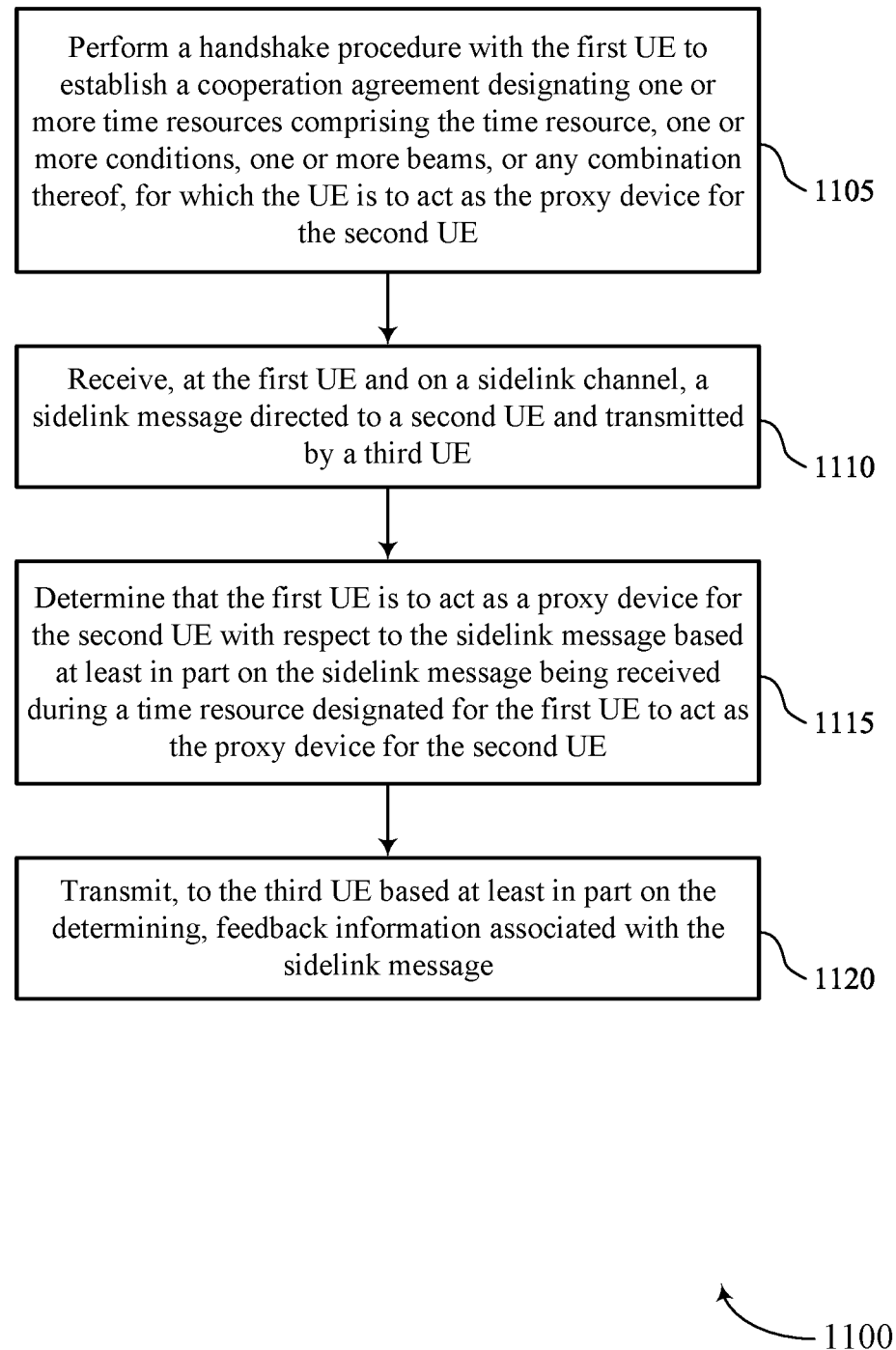

FIG. 11 shows a flowchart illustrating a method 1100 that supports device cooperation for mitigation of deafness in sidelink communications in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include performing a handshake procedure with the first UE to establish a cooperation agreement designating one or more time resources including the time resource, one or more conditions, one or more beams, or any combination thereof, for which the UE is to act as the proxy device for the second UE. The operations of 1105 may be performed in accordance with examples as disclosed herein. In some examples, aspects of the operations of 1105 may be performed by a sidelink resource designation component 855 as described with reference to FIG. 8.

At 1110, the method may include receiving, at the first UE and on a sidelink channel, a sidelink message directed to a second UE and transmitted by a third UE. The operations of 1110 may be performed in accordance with examples as disclosed herein. In some examples, aspects of the operations of 1110 may be performed by a sidelink reception component 825 as described with reference to FIG. 8.

At 1115, the method may include determining that the first UE is to act as a proxy device for the second UE with respect to the sidelink message based on the sidelink message being received during a time resource designated for the first UE to act as the proxy device for the second UE. The operations of 1115 may be performed in accordance with examples as disclosed herein. In some examples, aspects of the operations of 1115 may be performed by a sidelink timing component 830 as described with reference to FIG. 8.

At 1120, the method may include transmitting, to the third UE based on the determining, feedback information associated with the sidelink message. The operations of 1120 may be performed in accordance with examples as disclosed herein. In some examples, aspects of the operations of 1120 may be performed by a sidelink transmission component 835 as described with reference to FIG. 8.

Figure 12:
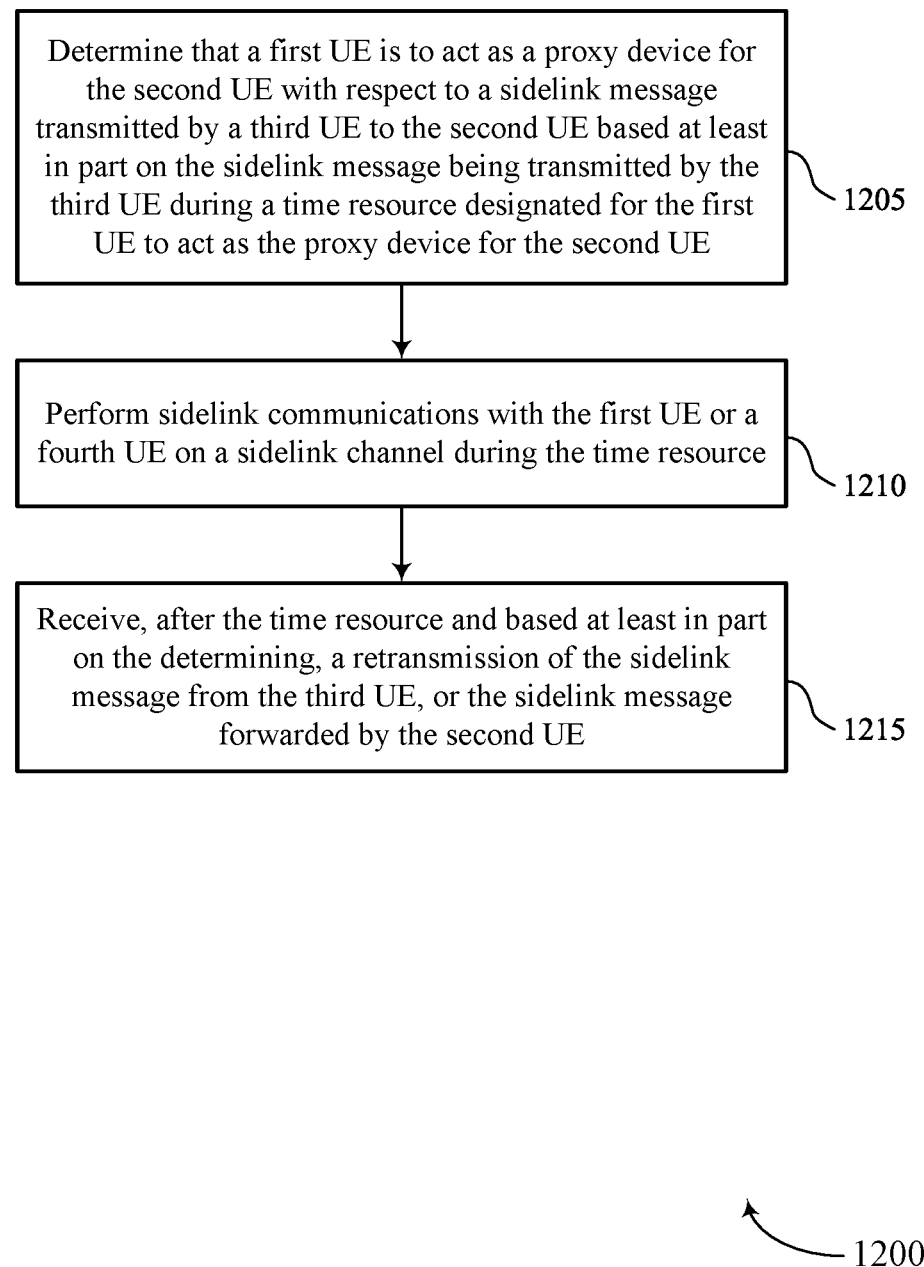

FIG. 12 shows a flowchart illustrating a method 1200 that supports device cooperation for mitigation of deafness in sidelink communications in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include determining that a first UE is to act as a proxy device for the second UE with respect to a sidelink message transmitted by a third UE to the second UE based on the sidelink message being transmitted by the third UE during a time resource designated for the first UE to act as the proxy device for the second UE. The operations of 1205 may be performed in accordance with examples as disclosed herein. In some examples, aspects of the operations of 1205 may be performed by a sidelink condition evaluation component 840 as described with reference to FIG. 8.

At 1210, the method may include performing sidelink communications with the first UE or a fourth UE on a sidelink channel during the time resource. The operations of 1210 may be performed in accordance with examples as disclosed herein. In some examples, aspects of the operations of 1210 may be performed by a sidelink communication component 845 as described with reference to FIG. 8.

At 1215, the method may include receiving, after the time resource and based on the determining, a retransmission of the sidelink message from the third UE, or the sidelink message forwarded by the second UE. The operations of 1215 may be performed in accordance with examples as disclosed herein. In some examples, aspects of the operations of 1215 may be performed by a sidelink reception component 825 as described with reference to FIG. 8.

Figure 13:
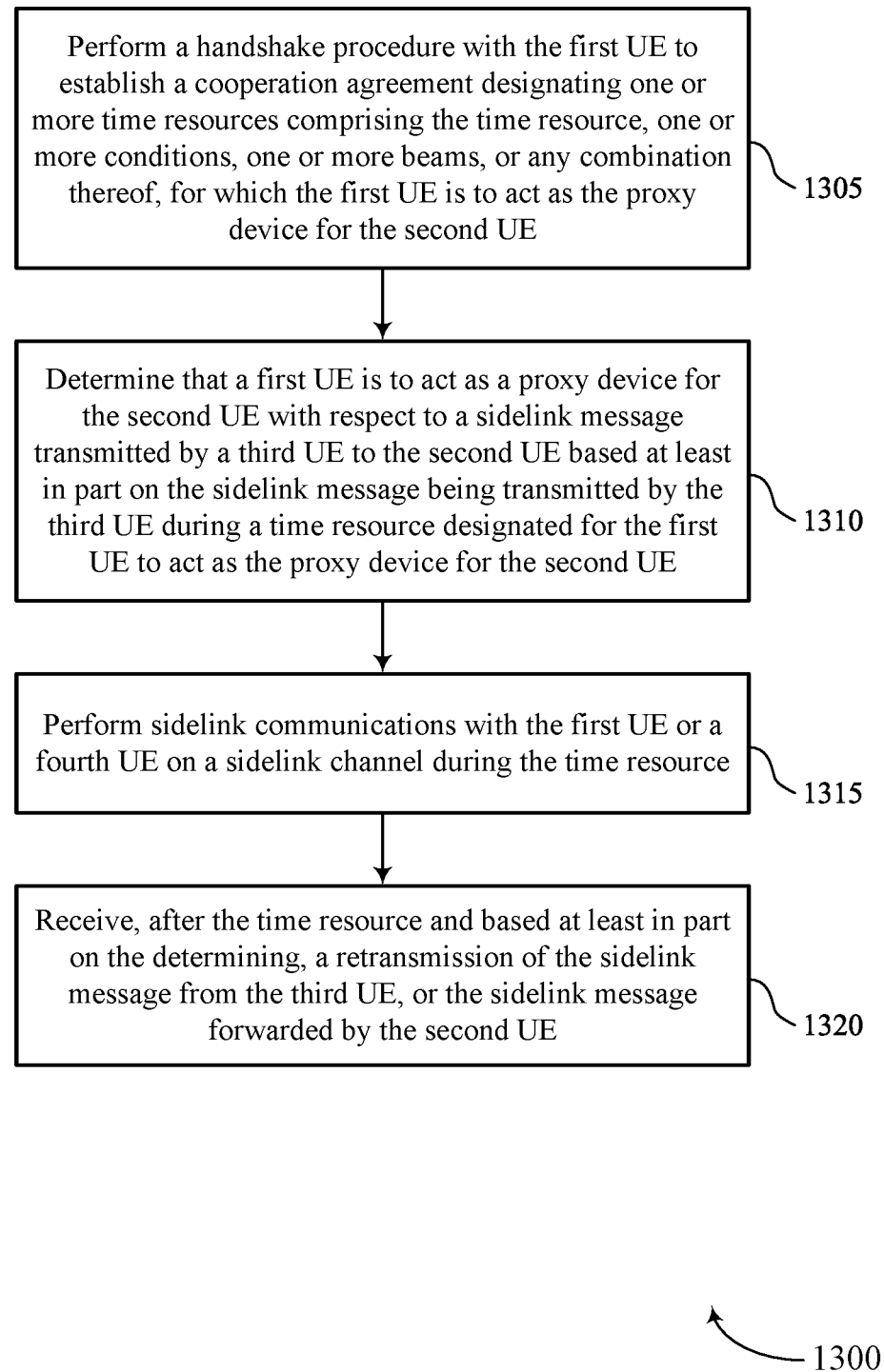

FIG. 13 shows a flowchart illustrating a method 1300 that supports device cooperation for mitigation of deafness in sidelink communications in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include performing a handshake procedure with the first UE to establish a cooperation agreement designating one or more time resources including the time resource, one or more conditions, one or more beams, or any combination thereof, for which the first UE is to act as the proxy device for the second UE. The operations of 1305 may be performed in accordance with examples as disclosed herein. In some examples, aspects of the operations of 1305 may be performed by a sidelink resource designation component 855 as described with reference to FIG. 8.

At 1310, the method may include determining that a first UE is to act as a proxy device for the second UE with respect to a sidelink message transmitted by a third UE to the second UE based on the sidelink message being transmitted by the third UE during a time resource designated for the first UE to act as the proxy device for the second UE. The operations of 1310 may be performed in accordance with examples as disclosed herein. In some examples, aspects of the operations of 1310 may be performed by a sidelink condition evaluation component 840 as described with reference to FIG. 8.

At 1315, the method may include performing sidelink communications with the first UE or a fourth UE on a sidelink channel during the time resource. The operations of 1315 may be performed in accordance with examples as disclosed herein. In some examples, aspects of the operations of 1315 may be performed by a sidelink communication component 845 as described with reference to FIG. 8.

At 1320, the method may include receiving, after the time resource and based on the determining, a retransmission of the sidelink message from the third UE, or the sidelink message forwarded by the second UE. The operations of 1320 may be performed in accordance with examples as disclosed herein. In some examples, aspects of the operations of 1320 may be performed by a sidelink reception component 825 as described with reference to FIG. 8.

The following provides an overview of aspects of the present disclosure:

Aspect 1: A method for wireless communications at a first UE, comprising: receiving, at the first UE and on a sidelink channel, a sidelink message directed to a second UE and transmitted by a third UE; determining that the first UE is to act as a proxy device for the second UE with respect to the sidelink message based at least in part on the sidelink message being received during a time resource designated for the first UE to act as the proxy device for the second UE; and transmitting, to the third UE based at least in part on the determining, feedback information associated with the sidelink message.

Aspect 2: The method of aspect 1, further comprising: receiving, from the second UE, control signaling designating a set of periodic time resources comprising the time resource for the first UE to act as the proxy device for the second UE, wherein determining that the first UE is to act as the proxy device for the second UE with respect to the sidelink message is based at least in part on receiving the control signaling.

Aspect 3: The method of aspect 2, wherein receiving the control signaling designating the set of periodic time resources for the first UE to act as the proxy device for the second UE comprises: receiving RRC signaling via the sidelink channel comprising a set of parameters, the set of parameters comprising a periodicity of the set of periodic time resources, an offset value for the set of periodic time resources, a length indicator for each of the rely time resources, or any combination thereof.

Aspect 4: The method of any of aspects 2 through 3, wherein receiving the control signaling designating the set of periodic time resources for the first UE to act as the proxy device for the second UE comprises: receiving the control signaling designating of the set of periodic time resources during a cooperation establishment procedure for establishing a cooperation agreement.

Aspect 5: The method of any of aspects 1 through 4, wherein determining that the first UE is to act as the proxy device for the second UE with respect to the sidelink message further comprises: receiving, the sidelink message on a first beam of a set of beams, wherein the set of beams is associated with the first UE acting as the proxy device for the second UE.

Aspect 6: The method of aspect 5, further comprising: receiving, from the first UE an indication of the set of beams during a cooperation establishment procedure for establishing a cooperation agreement.

Aspect 7: The method of any of aspects 5 through 6, further comprising: determining that the second UE is located in a geographic coverage area associated with the first beam, wherein determining that the first UE is to act as the proxy device for the second UE with respect to the sidelink message is based at least in part on determining that the second UE is located in the geographic coverage area associated with the first beam.

Aspect 8: The method of any of aspects 1 through 7, wherein determining that the first UE is to act as the proxy device for the second UE with respect to the sidelink message further comprises: determining that the sidelink message transmitted by the third UE satisfies one or more conditions.

Aspect 9: The method of aspect 8, wherein determining that the sidelink message satisfies the one or more conditions comprises: determining that a device identifier for the sidelink message is one of a set of device identifiers identified in a coordination agreement, determining that the sidelink message is a cast type identified in a coordination agreement, determining that the sidelink message is associated with a sidelink priority level identified in a coordination agreement, determining that the sidelink message is associated with a number of retransmissions identified in a coordination agreement, determining that the sidelink message includes a flag indicating a packet delay budget threshold, determining that the UE is located in a geographic coverage area associated with the time resource, or any combination thereof.

Aspect 10: The method of any of aspects 1 through 9, wherein determining that the first UE is to act as the proxy device for the second UE with respect to the sidelink message further comprises: receiving the sidelink message as a unicast sidelink message addressed to the second UE during the time resource.

Aspect 11: The method of any of aspects 1 through 10, further comprising: receiving, from the second UE, a SCI message designating the time resource for the first UE to act as the proxy device for the second UE, wherein determining that the first UE is to act as the proxy device for the second UE with respect to the sidelink message is based at least in part on receiving the SCI message.

Aspect 12: The method of any of aspects 1 through 11, further comprising: transmitting, to the second UE, an indication that the first UE received the sidelink message transmitted by the third UE during the time resource.

Aspect 13: The method of any of aspects 1 through 12, wherein transmitting the feedback information comprises: transmitting a NACK feedback message triggering a retransmission of the sidelink message.

Aspect 14: The method of aspect 13, further comprising: refraining from decoding a data message associated with the sidelink message, wherein the sidelink message comprises a SCI message.

Aspect 15: The method of any of aspects 13 through 14, further comprising: decoding the sidelink message; and transmitting, to the first UE on sidelink resources associated with the triggered retransmission, the sidelink message.

Aspect 16: The method of any of aspects 1 through 15, wherein transmitting the feedback information comprises: transmitting an ACK feedback message to the third UE indicating that the second UE successfully received the sidelink message.

Aspect 17: The method of aspect 16, further comprising: decoding the sidelink message; transmitting, to the first UE, an activation of a set of sidelink resources allocated for forwarding signaling received during the time resource; and transmitting, to the first UE on the set of sidelink resources, the sidelink message.

Aspect 18: The method of any of aspects 1 through 17, further comprising: performing a handshake procedure with the first UE to establish a cooperation agreement designating one or more time resources comprising the time resource, one or more conditions, one or more beams, or any combination thereof, for which the UE is to act as the proxy device for the second UE.

Aspect 19: A method for wireless communications at a second UE, comprising: determining that a first UE is to act as a proxy device for the second UE with respect to a sidelink message transmitted by a third UE to the second UE based at least in part on the sidelink message being transmitted by the third UE during a time resource designated for the first UE to act as the proxy device for the second UE; performing sidelink communications with the first UE or a fourth UE on a sidelink channel during the time resource; and receiving, after the time resource and based at least in part on the determining, a retransmission of the sidelink message from the third UE, or the sidelink message forwarded by the second UE.

Aspect 20: The method of aspect 19, wherein determining that the first UE is to act as the proxy device for the second UE comprises: performing a handshake procedure with the first UE to establish a cooperation agreement designating one or more time resources comprising the time resource, one or more conditions, one or more beams, or any combination thereof, for which the first UE is to act as the proxy device for the second UE.

Aspect 21: The method of any of aspects 19 through 20, wherein receiving the retransmission of the sidelink message comprises: receiving the retransmission of the sidelink message from the third UE.

Aspect 22: The method of any of aspects 19 through 21, wherein receiving the retransmission of the sidelink message comprises: receiving the retransmission of the sidelink message from the second UE via a set of sidelink resources allocated for retransmission of the sidelink message by the third UE.

Aspect 23: An apparatus for wireless communications at a first UE, comprising a processor; memory coupled with the processor; and instructions stored in the memory and executable by the processor to cause the apparatus to perform a method of any of aspects 1 through 18.

Aspect 24: An apparatus for wireless communications at a first UE, comprising at least one means for performing a method of any of aspects 1 through 18.

Aspect 25: A non-transitory computer-readable medium storing code for wireless communications at a first UE, the code comprising instructions executable by a processor to perform a method of any of aspects 1 through 18.

Aspect 26: An apparatus for wireless communications at a second UE, comprising a processor; memory coupled with the processor; and instructions stored in the memory and executable by the processor to cause the apparatus to perform a method of any of aspects 19 through 22.

Aspect 27: An apparatus for wireless communications at a second UE, comprising at least one means for performing a method of any of aspects 19 through 22.

Aspect 28: A non-transitory computer-readable medium storing code for wireless communications at a second UE, the code comprising instructions executable by a processor to perform a method of any of aspects 19 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:

receiving, at the first UE and on a sidelink channel, a sidelink message directed to a second UE and transmitted by a third UE;

determining that the first UE is to act as a proxy device for the second UE with respect to the sidelink message based at least in part on the sidelink message being received during a time slot designated for the first UE to act as the proxy device for the second UE; and transmitting, to the third UE based at least in part on the determining, feedback information associated with the sidelink message.

2. The method of claim 1, further comprising:

receiving, from the second UE, control signaling designating a set of periodic time slots comprising the time slot for the first UE to act as the proxy device for the second UE, wherein determining that the first UE is to act as the proxy device for the second UE with respect to the sidelink message is based at least in part on receiving the control signaling.

3. The method of claim 2, wherein receiving the control signaling designating the set of periodic time slots for the first UE to act as the proxy device for the second UE comprises:

receiving radio resource control signaling via the sidelink channel comprising a set of parameters, the set of parameters comprising a periodicity of the set of periodic time slots, an offset value for the set of periodic time slots, or any combination thereof.

4. The method of claim 2, wherein receiving the control signaling designating the set of periodic time slots for the first UE to act as the proxy device for the second UE comprises:

receiving the control signaling designating of the set of periodic time slots during a cooperation establishment procedure for establishing a cooperation agreement.

5. The method of claim 1, wherein determining that the first UE is to act as the proxy device for the second UE with respect to the sidelink message further comprises:

receiving, the sidelink message on a first beam of a set of beams, wherein the set of beams is associated with the first UE acting as the proxy device for the second UE.

6. The method of claim 5, further comprising:

receiving, from the first UE an indication of the set of beams during a cooperation establishment procedure for establishing a cooperation agreement.

7. The method of claim 5, further comprising:

determining that the second UE is located in a geographic coverage area associated with the first beam, wherein determining that the first UE is to act as the proxy device for the second UE with respect to the sidelink message is based at least in part on determining that the second UE is located in the geographic coverage area associated with the first beam.

8. The method of claim 1, wherein determining that the first UE is to act as the proxy device for the second UE with respect to the sidelink message further comprises:

determining that the sidelink message transmitted by the third UE satisfies one or more conditions.

9. The method of claim 8, wherein determining that the sidelink message satisfies the one or more conditions comprises:

determining that a device identifier for the sidelink message is one of a set of device identifiers identified in a coordination agreement, determining that the sidelink message is a cast type identified in the coordination agreement, determining that the sidelink message is associated with a sidelink priority level identified in the coordination agreement, determining that the sidelink message is associated with a number of retransmissions identified in the coordination agreement, determining that the sidelink message includes a flag indicating a packet delay budget threshold, determining that the UE is located in a geographic coverage area associated with the time slot, or any combination thereof.

10. The method of claim 1, wherein determining that the first UE is to act as the proxy device for the second UE with respect to the sidelink message further comprises:

receiving the sidelink message as a unicast sidelink message addressed to the second UE during the time slot.

11. The method of claim 1, further comprising:

receiving, from the second UE, a sidelink control information message designating the time slot for the first UE to act as the proxy device for the second UE, wherein determining that the first UE is to act as the proxy device for the second UE with respect to the sidelink message is based at least in part on receiving the sidelink control information message.

12. The method of claim 1, further comprising:

transmitting, to the second UE, an indication that the first UE received the sidelink message transmitted by the third UE during the time slot.

13. The method of claim 1, wherein transmitting the feedback information comprises:

transmitting a negative acknowledgement feedback message triggering a retransmission of the sidelink message.

14. The method of claim 13, further comprising:

refraining from decoding a data message associated with the sidelink message, wherein the sidelink message comprises a sidelink control information message.

15. The method of claim 13, further comprising:

decoding the sidelink message; and transmitting, to the first UE on sidelink resources associated with the triggered retransmission, the sidelink message.

16. The method of claim 1, wherein transmitting the feedback information comprises:

transmitting an acknowledgement feedback message to the third UE indicating that the second UE successfully received the sidelink message.

17. The method of claim 16, further comprising:

decoding the sidelink message;

transmitting, to the first UE, an activation of a set of sidelink resources allocated for forwarding signaling received during the time slot; and transmitting, to the first UE on the set of sidelink resources, the sidelink message.

18. The method of claim 1, further comprising:

performing a handshake procedure with the first UE to establish a cooperation agreement designating one or more time slots comprising the time slot, one or more conditions, one or more beams, or any combination thereof, for which the UE is to act as the proxy device for the second UE.

19. A method for wireless communications at a second user equipment (UE), comprising:

determining that a first UE is to act as a proxy device for the second UE with respect to a sidelink message transmitted by a third UE to the second UE based at least in part on the sidelink message being transmitted by the third UE during a time slot Yes-au-Pee designated for the first UE to act as the proxy device for the second UE;

performing sidelink communications with the first UE or a fourth UE on a sidelink channel during the time slot; and receiving, after the time slot and based at least in part on the determining, a retransmission of the sidelink message from the third UE, or the sidelink message forwarded by the second UE.

20. The method of claim 19, wherein determining that the first UE is to act as the proxy device for the second UE comprises:
performing a handshake procedure with the first UE to establish a cooperation agreement designating one or more time slots comprising the time slot, one or more conditions, one or more beams, or any combination thereof, for which the first UE is to act as the proxy device for the second UE.

21. The method of claim 19, wherein receiving the retransmission of the sidelink message comprises:
receiving the retransmission of the sidelink message from the third UE.

22. The method of claim 19, wherein receiving the retransmission of the sidelink message comprises:
receiving the retransmission of the sidelink message from the second UE via a set of sidelink resources allocated for the retransmission of the sidelink message by the third UE.

23. An apparatus for wireless communications at a first user equipment (UE), comprising:
a processor;
memory coupled with the processor; and
instructions stored in the memory and executable by the processor to cause the apparatus to:
receive, at the first UE and on a sidelink channel, a sidelink message directed to a second UE and transmitted by a third UE;
determine that the first UE is to act as a proxy device for the second UE with respect to the sidelink message based at least in part on the sidelink message being received during a time slot designated for the first UE to act as the proxy device for the second UE; and
transmit, to the third UE based at least in part on the determining, feedback information associated with the sidelink message.

24. The apparatus of claim 23, wherein the instructions are further executable by the processor to cause the apparatus to:
receive, from the second UE, control signaling designating a set of periodic time slots comprising the time slot for the first UE to act as the proxy device for the second UE, wherein determining that the first UE is to act as the proxy device for the second UE with respect to the sidelink message is based at least in part on receiving the control signaling.

25. The apparatus of claim 24, wherein the instructions to receive the control signaling designating the set of periodic time slots for the first UE to act as the proxy device for the second UE are executable by the processor to cause the apparatus to:
receive radio resource control signaling via the sidelink channel comprising a set of parameters, the set of parameters comprising a periodicity of the set of periodic time slots, an offset value for the set of periodic time slots, or any combination thereof.

26. The apparatus of claim 24, wherein the instructions to receive the control signaling designating the set of periodic time slots for the first UE to act as the proxy device for the second UE are executable by the processor to cause the apparatus to:
receive the control signaling designating of the set of periodic time slots during a cooperation establishment procedure for establishing a cooperation agreement.

27. The apparatus of claim 23, wherein the instructions to determine that the first UE is to act as the proxy device for the second UE with respect to the sidelink message are further executable by the processor to cause the apparatus to:
receive, the sidelink message on a first beam of a set of beams, wherein the set of beams is associated with the first UE acting as the proxy device for the second UE.

28. The apparatus of claim 27, wherein the instructions are further executable by the processor to cause the apparatus to:
receive, from the first UE an indication of the set of beams during a cooperation establishment procedure for establishing a cooperation agreement.

29. An apparatus for wireless communications at a second user equipment (UE), comprising:
a processor;
memory coupled with the processor; and
instructions stored in the memory and executable by the processor to cause the apparatus to:
determine that a first UE is to act as a proxy device for the second UE with respect to a sidelink message transmitted by a third UE to the second UE based at least in part on the sidelink message being transmitted by the third UE during a time slot designated for the first UE to act as the proxy device for the second UE;
perform sidelink communications with the first UE or a fourth UE on a sidelink channel during the time slot; and
receive, after the time slot and based at least in part on the determining, a retransmission of the sidelink message from the third UE, or the sidelink message forwarded by the second UE.

30. The apparatus of claim 29, wherein the instructions to determine that the first UE is to act as the proxy device for the second UE are executable by the processor to cause the apparatus to:
perform a handshake procedure with the first UE to establish a cooperation agreement designating one or more time slots comprising the time slot, one or more conditions, one or more beams, or any combination thereof, for which the first UE is to act as the proxy device for the second UE.

* * * * *